United States Patent
Faulkner et al.

(10) Patent No.: US 12,192,257 B2
(45) Date of Patent: Jan. 7, 2025

(54) 2D AND 3D TRANSITIONS FOR RENDERINGS OF USERS PARTICIPATING IN COMMUNICATION SESSIONS

(71) Applicant: MICROSOFT TECHNOLOGY LICENSING, LLC, Redmond, WA (US)

(72) Inventors: Jason Thomas Faulkner, Seattle, WA (US); Mansoor Jafry, Seattle, WA (US); Xonatia Ravelle Lee, Seattle, WA (US); Chad Aron Voss, Seattle, WA (US); Albert Robles, Redmond, WA (US); Timothy James Brookins, Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/824,869

(22) Filed: May 25, 2022

(65) Prior Publication Data

US 2023/0388357 A1  Nov. 30, 2023

(51) Int. Cl.
*H04L 65/403* (2022.01)
*H04L 12/18* (2006.01)
*H04N 13/366* (2018.01)

(52) U.S. Cl.
CPC ........ *H04L 65/403* (2013.01); *H04L 12/1822* (2013.01); *H04N 13/366* (2018.05)

(58) Field of Classification Search
CPC .. H04L 65/403; H04L 12/1822; H04N 13/366
(Continued)

(56) References Cited

U.S. PATENT DOCUMENTS 7,006,616 B1   2/2006  Christofferson et al.
9,819,877 B1   11/2017  Faulkner et al.
(Continued)

FOREIGN PATENT DOCUMENTS

WO   2021257868 A1   12/2021
WO   2022066642 A1   3/2022

OTHER PUBLICATIONS

Fisher, How to Create a Loomie 3D Avatar For All Your Zoom Meetings, Feb. 15, 2021, Lifewise Tech for Humans, retrieved from https://www.lifewire.com/create-3d-avatar-loomie-5075012#:~:text=Otherwise%2C%20choose%20the%20settings%20button,avatar%20in%20place%20of%20you (Year: 2021).*

(Continued)

*Primary Examiner* — Nicholas R Taylor
*Assistant Examiner* — Chong G Kim
(74) *Attorney, Agent, or Firm* — Scott Y. Shigeta; Newoprt IP, LLC

(57) ABSTRACT

Systems for transitioning a user interface arrangement from a display of a two-dimensional image of a user to a rendering of a three-dimensional representation of the user is provided. A system can start with a UI including a rendering of a user that is based on a 2D image file. The system can receive an input that is configured to cause the system to transition the display of the rendering of the 2D image of the select user to a rendering of the three-dimensional representation of the select user. To display the rendering of the 3D representation of the select user, the system uses permission data and a three-dimensional model defining a position and orientation to display the 3D representation of the user. The system allows users to switch between viewing modes to allow users to interact with content using the most effective type of hardware.

20 Claims, 15 Drawing Sheets

(58) Field of Classification Search
USPC ........................................................ 709/204
See application file for complete search history.

(56) References Cited

U.S. PATENT DOCUMENTS

| | | | |
|---|---|---|---|
| 10,592,013 | B2 | 3/2020 | Mandel-iaia et al. |
| 11,682,164 | B1* | 6/2023 | Krol .................... G06T 15/60 345/426 |
| 11,689,696 | B2 | 6/2023 | Lin |
| 2010/0153497 | A1 | 6/2010 | Sylvain et al. |
| 2014/0163982 | A1 | 6/2014 | Daborn et al. |
| 2015/0304366 | A1 | 10/2015 | Hallman et al. |
| 2017/0053542 | A1 | 2/2017 | Wilson |
| 2017/0372505 | A1* | 12/2017 | Bhat ........................ G06T 7/73 |
| 2018/0278891 | A1 | 9/2018 | Pan |
| 2019/0332189 | A1 | 10/2019 | Mandel-iaia et al. |
| 2020/0184701 | A1* | 6/2020 | Chand .................... G06T 19/20 |
| 2021/0027511 | A1* | 1/2021 | Shang .................... G06N 3/044 |
| 2021/0349604 | A1* | 11/2021 | Van Wie ............. G06F 16/9537 |
| 2021/0392175 | A1* | 12/2021 | Gronau .................. H04N 7/147 |
| 2022/0066620 | A1 | 3/2022 | Anderson et al. |
| 2022/0086203 | A1 | 3/2022 | Morris et al. |
| 2022/0124286 | A1 | 4/2022 | Punwani |
| 2022/0214743 | A1 | 7/2022 | Dascola |
| 2022/0374136 | A1 | 11/2022 | Chang et al. |
| 2022/0393997 | A1 | 12/2022 | Hong |
| 2023/0135075 | A1 | 5/2023 | Springer |
| 2023/0164298 | A1* | 5/2023 | Khot ........................ H04N 7/15 348/14.08 |
| 2023/0206531 | A1* | 6/2023 | Agura .................... G06T 11/40 345/473 |
| 2023/0222721 | A1* | 7/2023 | Chen ...................... G06T 13/40 345/419 |
| 2023/0386145 | A1 | 11/2023 | Faulkner |

OTHER PUBLICATIONS

"International Search Report and Written Opinion Issued in PCT Application No. PCT/US23/018798", Mailed Date: Aug. 10, 2023, 15 Pages.
"International Search Report and Written Opinion Issued in PCT Application No. PCT/US23/018396", Mailed Date: Jul. 14, 2023, 11 Pages.
"International Search Report and Written Opinion Issued in PCT Application No. PCT/US23/019181", Mailed Date: Aug. 2, 2023, 11 Pages.
"Non Final Office Action Issued in U.S. Appl. No. 17/827,588", Mailed Date: Sep. 15, 2023, 23 Pages.
U.S. Appl. No. 17/827,588, filed May 27, 2022.
U.S. Appl. No. 17/827,618, filed May 27, 2022.
Non-Final Office Action mailed on Oct. 5, 2023, in U.S. Appl. No. 17/827,618, 23 Pages.
Final Office Action mailed on Jun. 7, 2024, in U.S. Appl. No. 17/827,588, 26 pages.
Final Office Action mailed on May 30, 2024, in U.S. Appl. No. 17/827,618, 30 pages.
Non-Final Office Action mailed on Sep. 9, 2024, in U.S. Appl. No. 17/827,618, 33 pages.
Non-Final office action mailed on Sep. 23, 2024, in U.S. Appl. No. 17/827,588, 30 pages.

* cited by examiner

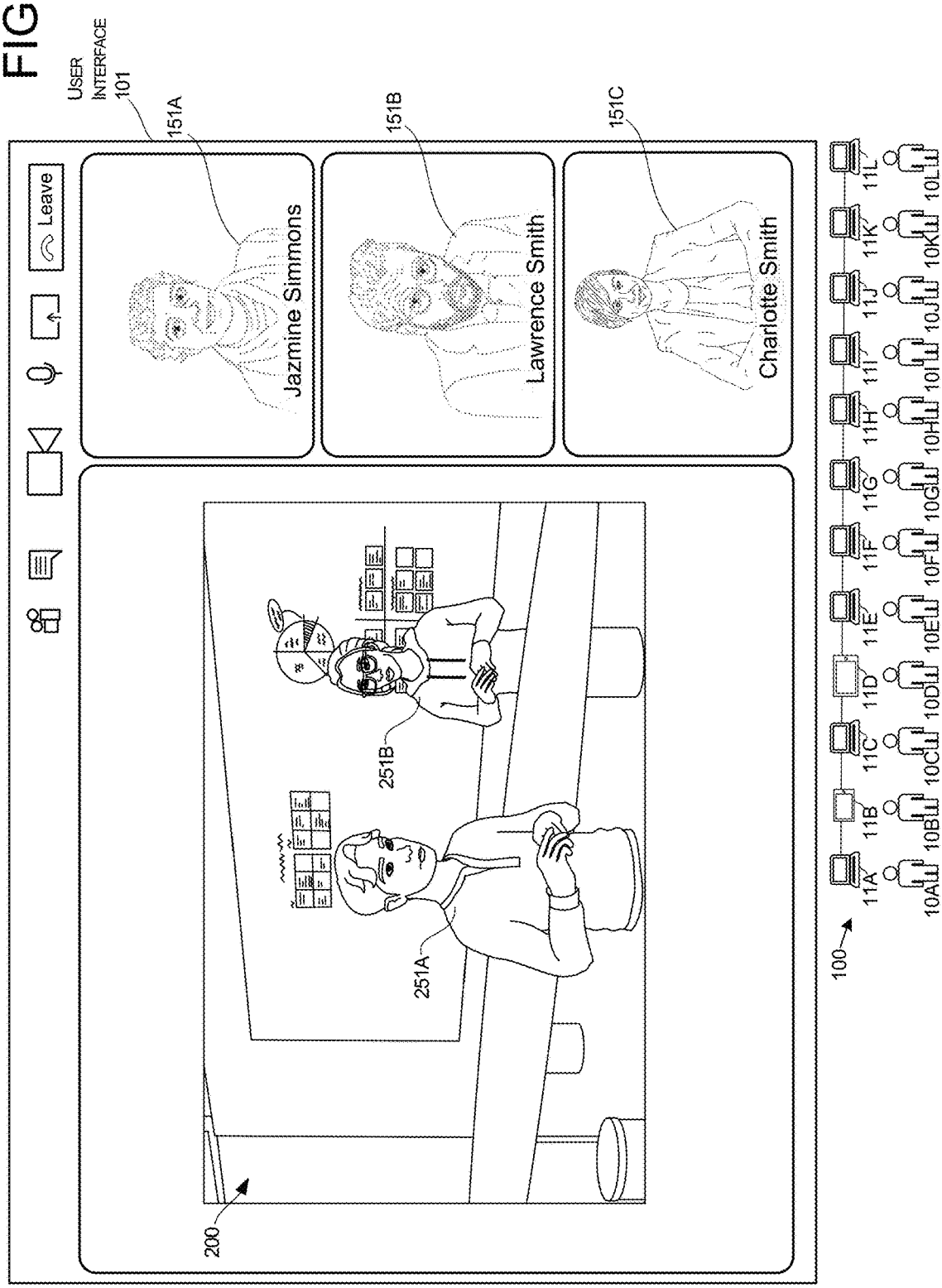

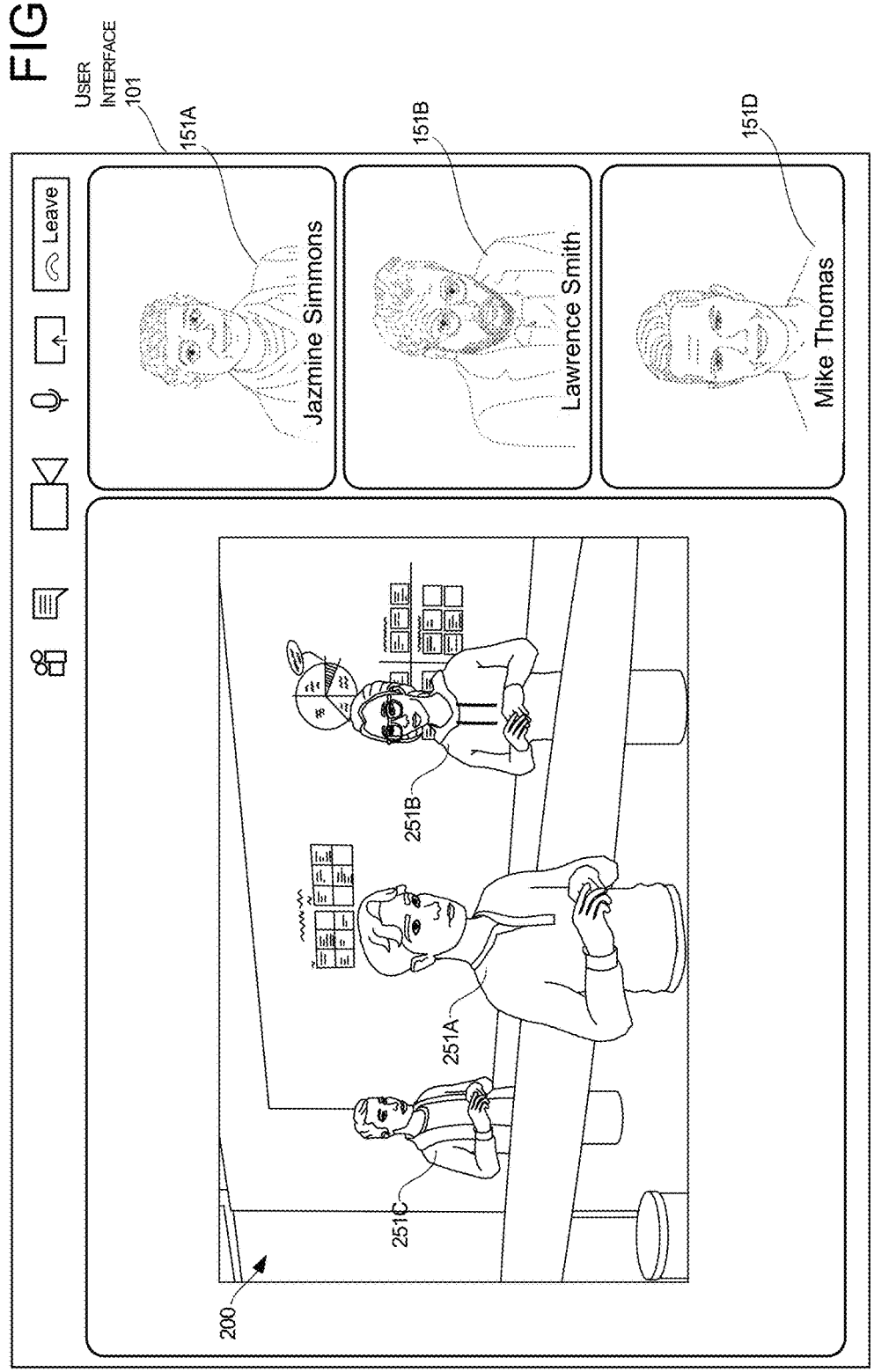

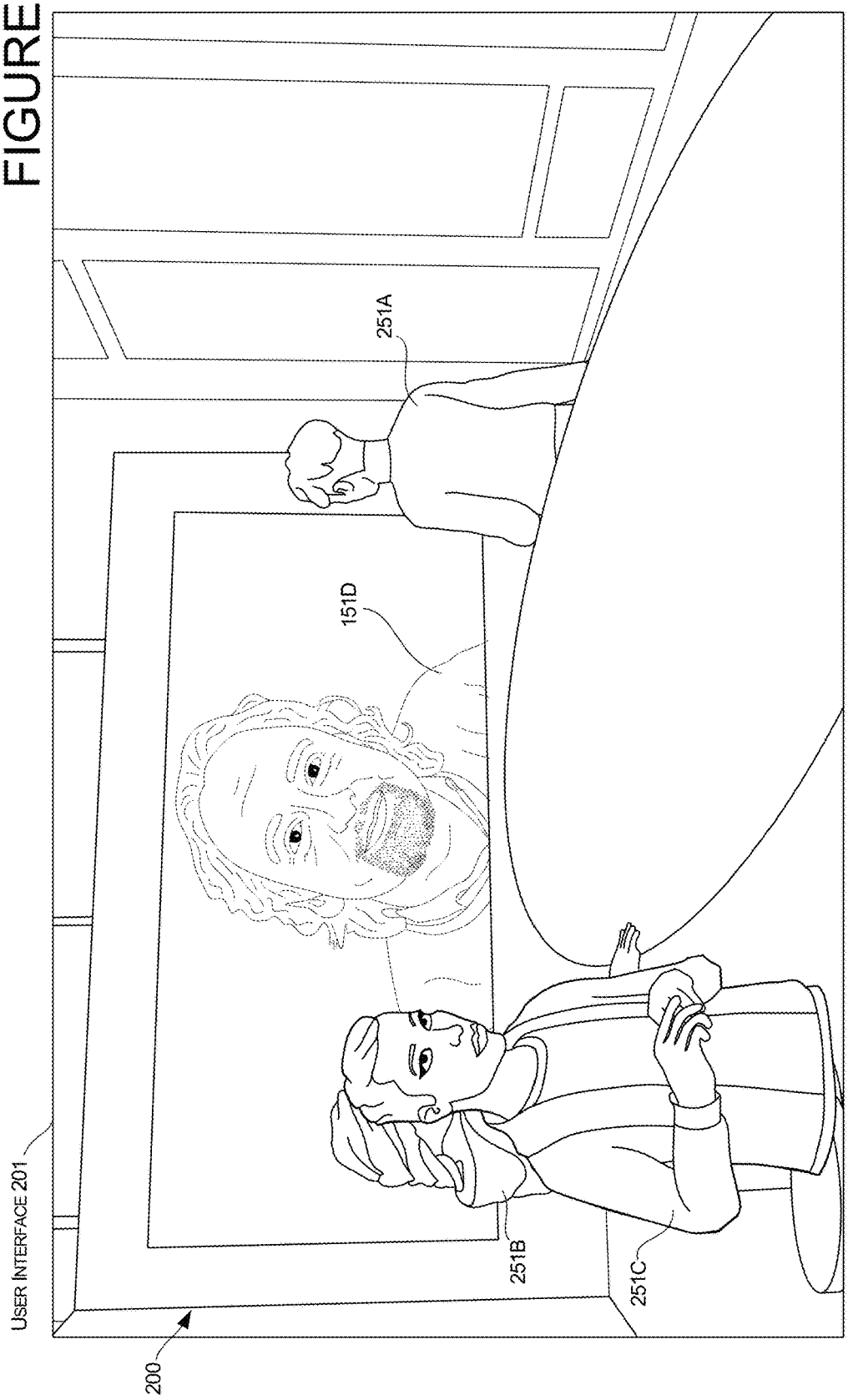

FIGURE 4B

FIRST OPERATING MODE:
PERMISSIONS ALLOW USE OF IMAGE FILE FOR A DISPLAY OF A USER WHEN A REPRESENTATION OF THE USER IS NOT INCLUDED IN THE 3D MODEL

Permission Data 315
IMAGE DATA ATTRIBUTES
R, W, E

2D Image Data 310

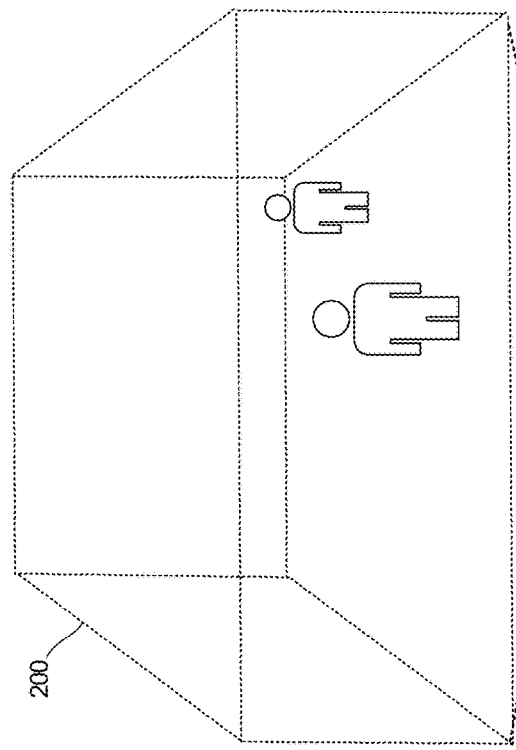

3D Model Data 320A

SECOND OPERATING MODE:
PERMISSIONS RESTRICT THE USE OF THE IMAGE FILE FOR A DISPLAY OF A USER WHEN A REPRESENTATION OF THE USER IS INCLUDED IN THE 3D MODEL AND THE SYSTEM USES THE MODEL DATA TO GENERATE A 3D REPRESENTATION OF THE USER

Permission Data 315
IMAGE DATA ATTRIBUTES
--, W, E

2D Image Data 310

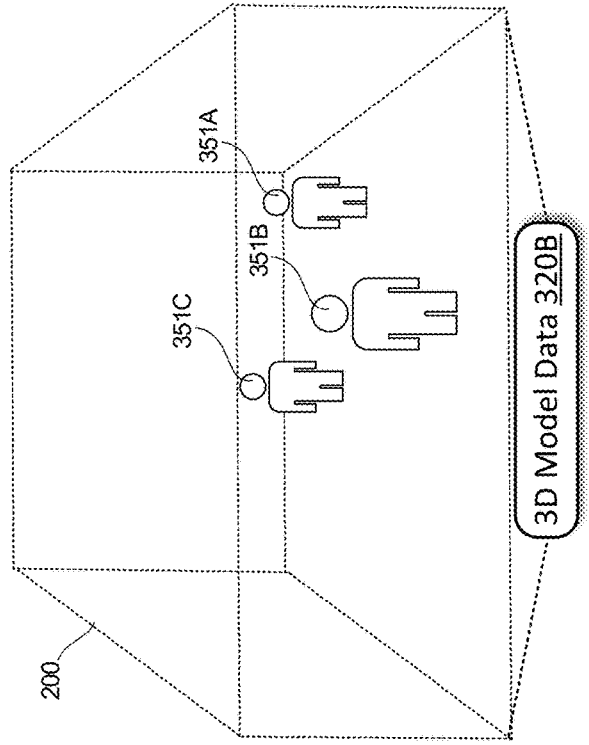

3D Model Data 320B

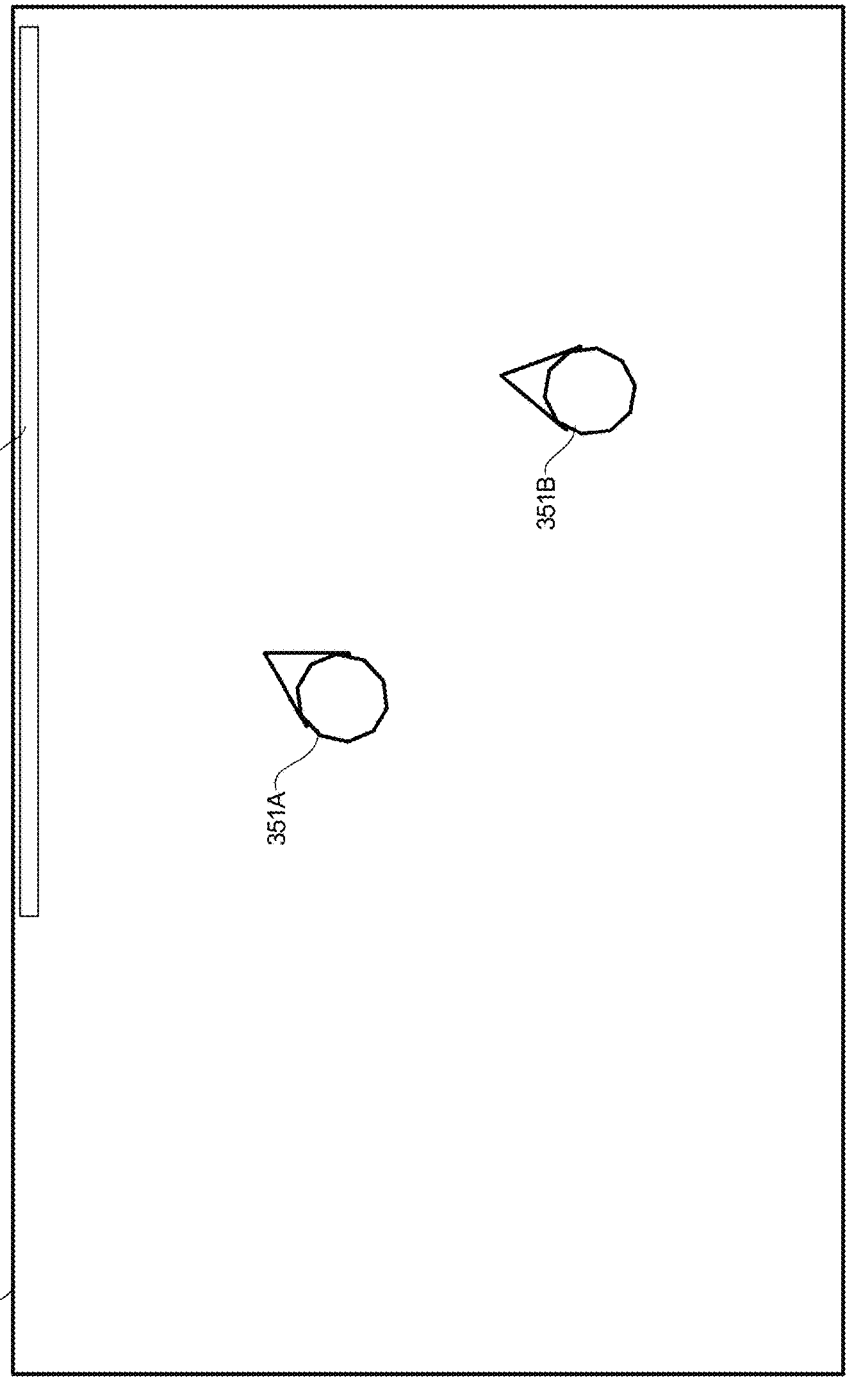

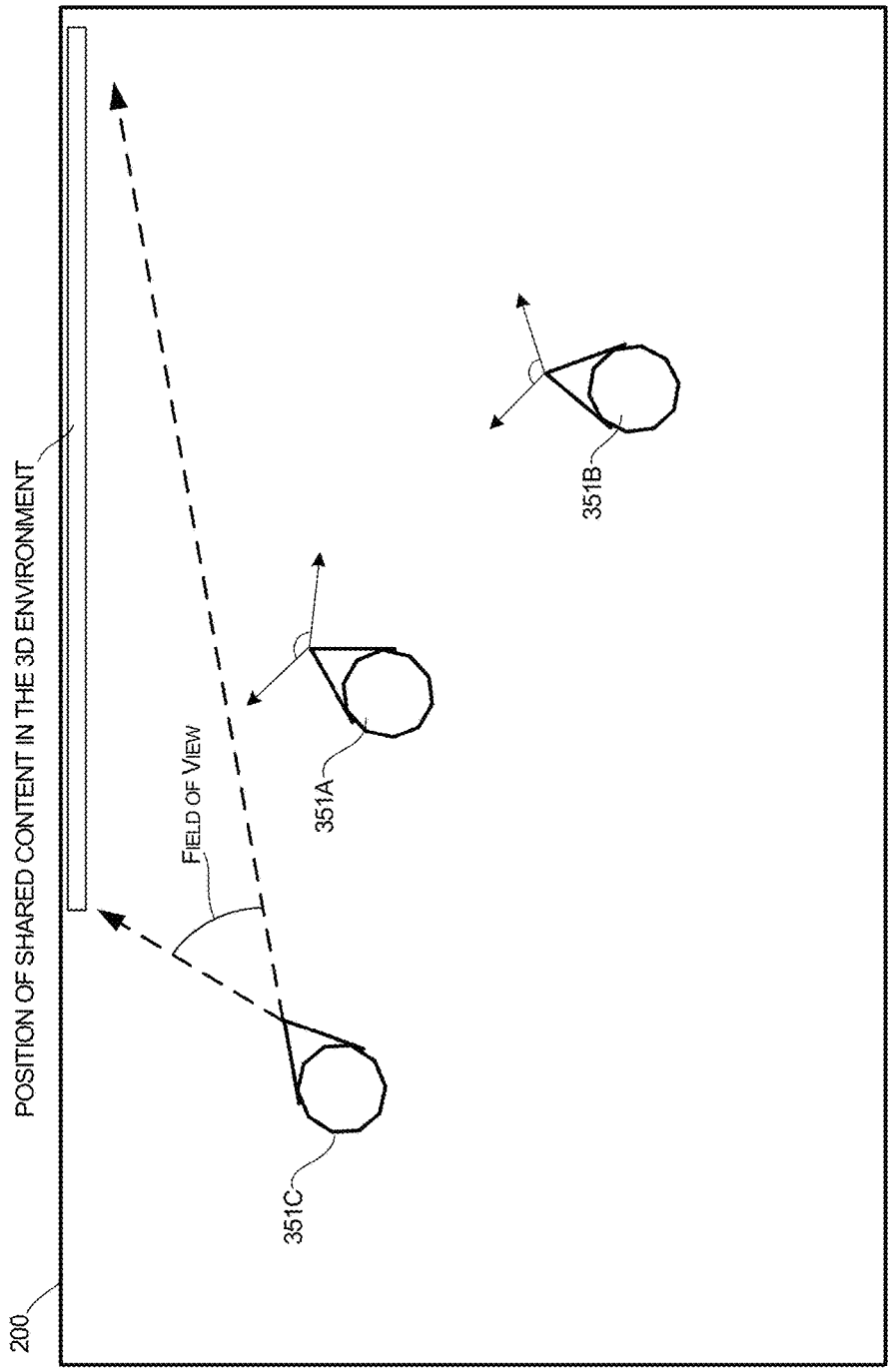

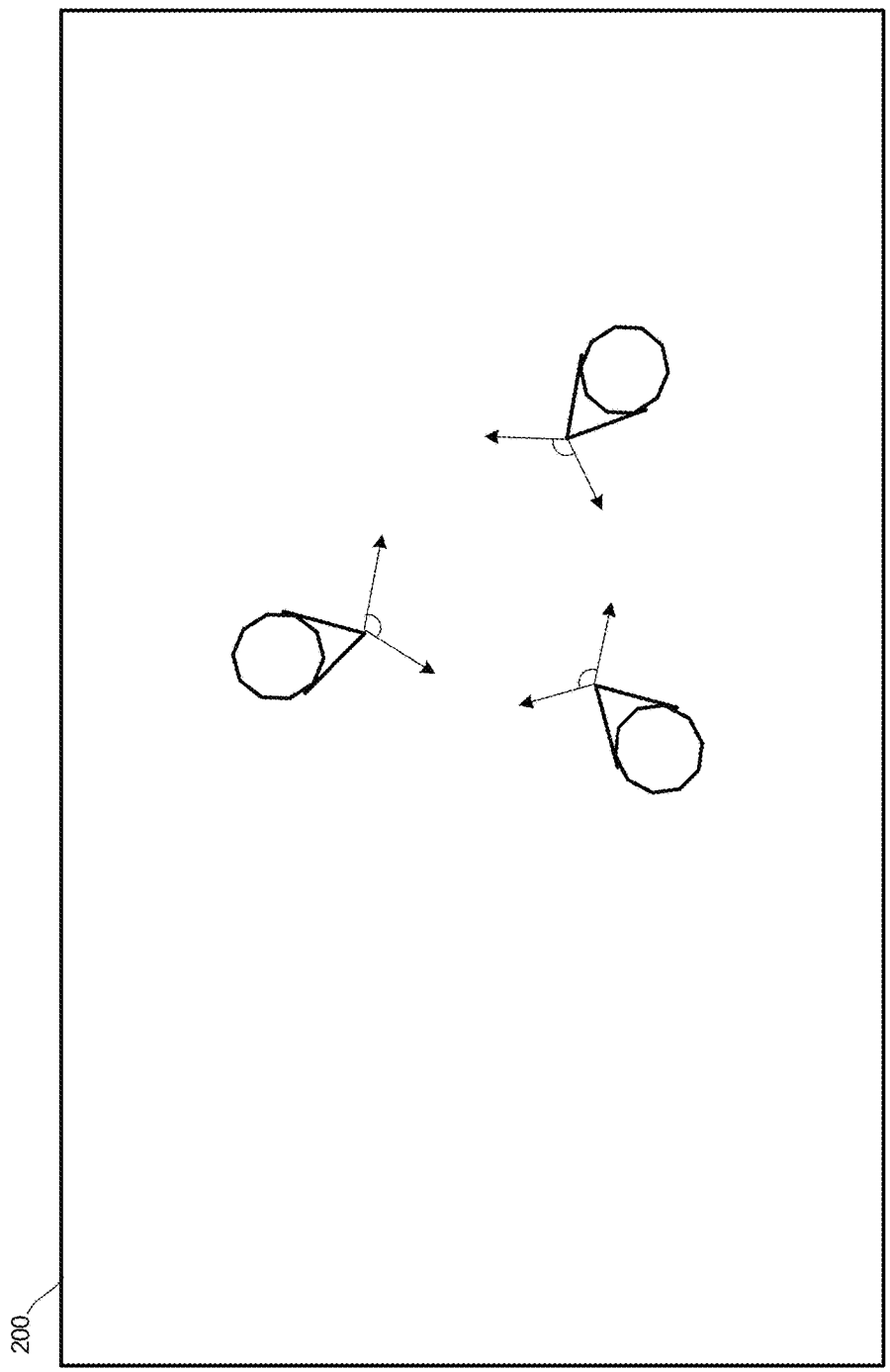

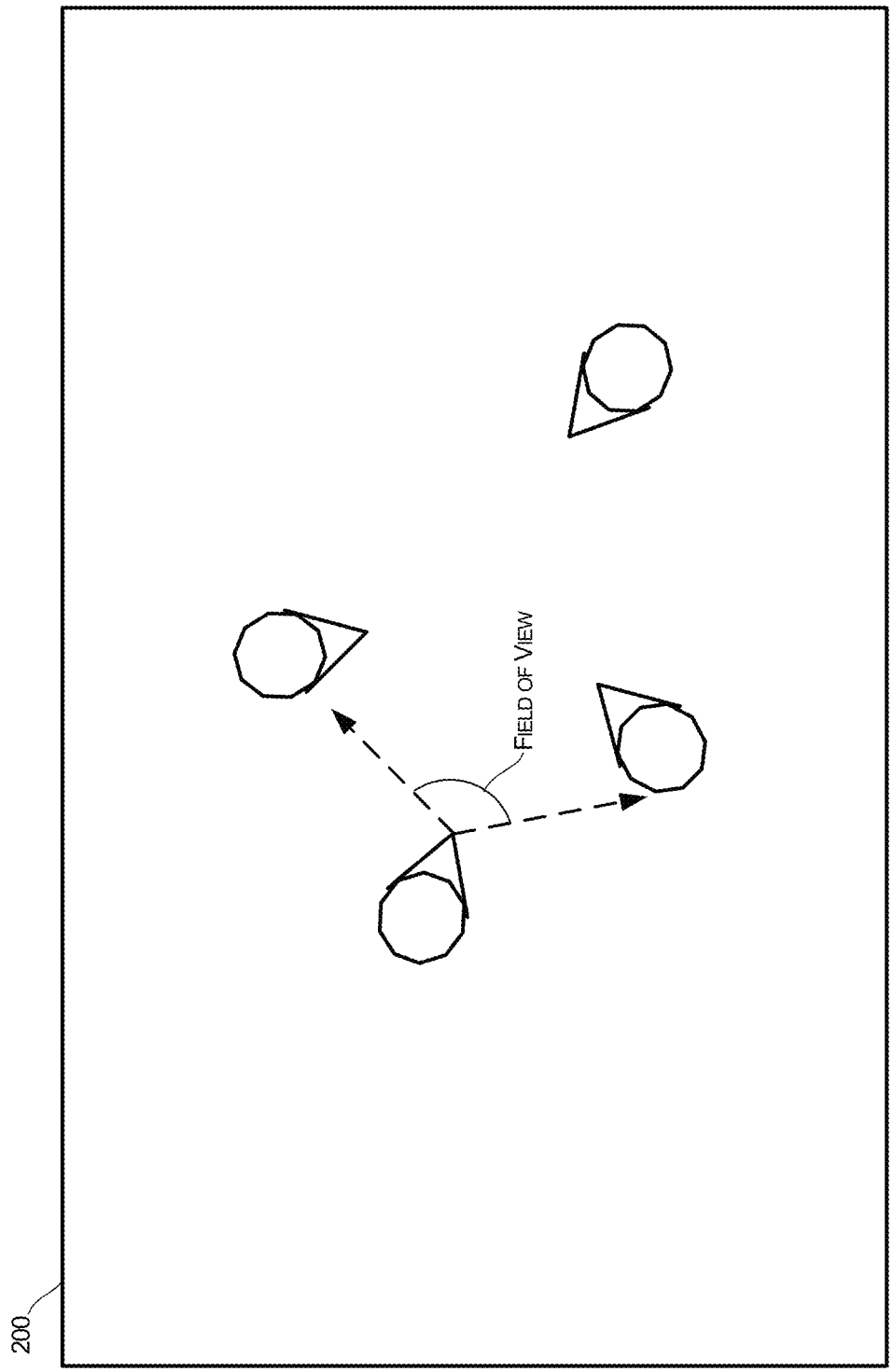

2D AND 3D TRANSITIONS FOR RENDERINGS OF USERS PARTICIPATING IN COMMUNICATION SESSIONS

BACKGROUND

The use of meta-verse environments for on-line meeting applications is becoming ubiquitous. Participants of online meetings now meet in three-dimensional virtual environments and share content within those virtual environments. Despite a number of benefits over other forms of collaboration, the use of 3D environments for sharing content can raise a number of drawbacks.

One of the main issues with using meta-verse environments for on-line meeting applications is that there may be scenarios where not all participants of a meeting have the same type of equipment. For example, some participants may be operating a PC while other participants may be operating a VR headset. This scenario may be due to the availability of hardware, while in other situations, users may have different types of equipment based on personal preferences. Personal preferences of the types of hardware may be based on the capabilities of each type of device. Some types of computers, such as desktop devices, are better for certain roles and meeting functions, such as editing content. In such cases, it may be better for some people to be engaged in a meta-verse environment meeting while using a desktop computer, while other users that are consuming the content may be using a head-mounted display device.

In some cases, the desktop device users are at a disadvantage because they cannot navigate or interact with all of the users in the virtual environment. When a computer provides a 2D view of a 3D environment, that computer is limited in how it can receive input gestures for users to navigate or interact with the 3D environment. Given these issues involving different types of devices and different types of environments, current technologies do not give the VR headset users and the PC users the same experience. Moreover, even if a user wanted to transition from a VR headset to a desktop device, or vice versa, some existing systems may not always provide seamless transitions during events such as a gathering or company meeting.

SUMMARY

The techniques disclosed herein enable systems to transition a user interface arrangement from a display of a two-dimensional image of a user to a rendering of a three-dimensional representation of the user while the user is participating in a communication session, such as a meeting. In some configurations, a select user can start in a gallery mode, where a rendering of the user is based on data received from an image file or a live video of the user. In some configurations, the select user can be displayed in a user interface displaying other users that are participating in a meeting. The other users can be displayed as 2D renderings from images or live video streams. The other users can also be displayed as 3D representations, e.g., avatars, positioned within a 3D environment. The system can receive an input that is configured to cause the system to transition the display of the rendering of the two-dimensional image of the select user to a rendering of the three-dimensional representation of the select user. To display the rendering of the 3D representation of the select user, the system accesses a three-dimensional model defining a position and orientation of the three-dimensional representation of the select user within a 3D environment. The 3D environment can be a model of a conference room, in which 3D representations of the users are positioned. The input can include a voice command, a key input, or another type of input gesture. In some embodiments, the input can indicate that the user is operating with a particular device type, such as a desktop PC, and based on that device type, the system may cause the transition. In response to the input for causing the transition of the display of the rendering of the two-dimensional image of the user to the rendering of the three-dimensional representation of the user, the system can modify of the user interface arrangement to remove the rendering of the two-dimensional image of the user and add the display of the three-dimensional representation of the user in a rendering of the 3D environment. This transition can cause the system to use the position and the orientation defined in the three-dimensional model to place the user's avatar in the 3D environment.

The techniques disclosure in provide a number of technical benefits. For instance, when a system detects that a user is operating a desktop computer, some systems may cause a display of a 2D image of that user. This may be due to the fact that a desktop computer and a desktop camera maybe more suitable for displaying a 2D image of that user. However, if that user wishes to participate in a meeting using a 3D representation, e.g., an avatar in a 3D environment, the techniques disclosure in allow that user to make that transition using a desktop computer without switching to a headset. The techniques disclosed herein also change the operating mode of the computer to allow the user to navigate within the 3D environment using keyboard controls. This allows users to interact with a computer in a 3D environment while utilizing certain types of computers such as desktop devices to access specialized editing tools that are optimized for certain 3D models.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A illustrates a first stage of a transition of a user interface for a desktop display device, where the transition starts with a display of a two-dimensional image of a user and changes to a rendering of a three-dimensional representation of the user while the user is participating in a communication session.

FIG. 1B illustrates a second stage of a transition of a user interface from a display of a two-dimensional image of a user to a rendering of a three-dimensional representation of the user while the user is participating in a communication session.

FIG. 2B illustrates a second stage of a transition of a user interface from a display of a two-dimensional image of a user to a rendering of a three-dimensional representation of the user while the user is participating in a communication session.

FIG. 4B illustrates two operating modes of a system and how each operating mode changes permissions for displaying individuals participating in a communication session.

FIG. 5A illustrates a scenario where avatars for a first user and a second user are oriented such that the users are looking at a virtual display of content within the virtual environment.

FIG. 5B illustrates a scenario where an avatar for a newly added user to a communication session is positioned and oriented based on existing user's avatars looking at a virtual display of content within the virtual environment.

FIG. 6A illustrates a scenario where avatars for a first user and a second user are oriented such that the users are looking at each other within the virtual environment.

FIG. 6B illustrates a scenario where an avatar for a newly added user to a communication session is positioned and oriented based on existing user's avatars looking at each other within the virtual environment.

DETAILED DESCRIPTION

Figure 2A:
FIG. 2A illustrates a first stage of a transition of a user interface for a head-mounted display device, where the transition starts with a display of a two-dimensional image of a user and changes to a rendering of a three-dimensional representation of the user while the user is participating in a communication session.

FIGS. 1A and 1B illustrate an example of a transition of a user interface arrangement from a display of a two-dimensional image of a user to a rendering of a three-dimensional representation of the user while the user is participating in a communication session. The communication session can be managed by a system 100 comprising a number of computers 11 each corresponding to a number of users 10. The computers can be in the form of desktop computers, head-mounted display units, tablets, mobile phones, etc. The system can generate a user interface showing aspects of the communication session to each of the users. In this example, a user interface 101 can include a number of renderings of each user 10. The renderings can include renderings of two-dimensional (2D) images, which can include a picture or live video feed of a user. The renderings can also include renderings of the three-dimensional (3D) representations, which can include avatars positioned within a 3D virtual environment 200. In this particular example, the user interface 101 includes a 2D rendering 151A of a first user 10A, a 2D rendering 151B of a second user 10B, and a 2D rendering 151A of a first user 10C. The user interface 101 also includes a 3D rendering of a representation 251D of a fourth user 10D and another 3D rendering of a representation 251E of a fifth user 10E.

In this example, the rendering of the third user 10C will undergo a transition from the 2D mode where they are shown as a rendering of a 2D image, to a 3D mode where they are represented as a 3D object in a 3D environment. To illustrate aspects of this transition, the user interface 101 shown in FIG. 1A can be a user interface that is displayed on a computing device of other users, such as the first computer 11A which is associated with the first user 10A, or any other user other than the third user 10C. This shows the perspective to others what happens when the third user 10C makes a transition from 2D mode to 3D mode. This example is provided for illustrative purposes and is not to be construed as limiting. It can be appreciated that this example UI can be displayed on any computing device of any of the users participating in the communication session.

To start the transition, the system can receive an input for causing the transition of the display of the rendering of the two-dimensional image of a particular user. In this example, the input identifies the third user 10C. The input can also provide permission that allow the system to access a 3D model defining a position and orientation for a three-dimensional representation of the third user 10C. The position and orientation can include vectors and coordinates for the representation within the 3D environment 200, Which is also referred to herein as a virtual environment 200.

As shown in FIGS. 1A and 1B, in response to receiving the input, one or more computers of the system 100 can cause a modification of the user interface 101 to remove the rendering of the image 151C of the user 10C as shown in FIG. 1A, and add a rendering of a 3D representation 251C of the user 10C as shown in FIG. 1B. The rendering of the 3D representation 251C of the user 10C can be positioned and oriented within the 3D environment according to coordinates and/or vectors defined in the 3D model.

In this example, the removal of the rendering of the 2D image of the user 10C, can be replaced with other renderings. For example, the 2D image rendering of the third user 10C shown in FIG. 1A is replaced in the UI with another 2D image of another user, the fourth user 10D as shown in FIG. 1B. This transition, otherwise referred to herein as a teleportation, enables a particular user, such as the third user 10C, to transition the display of how they appear to other users of the communication session. In addition, this transition enables that user to interact with a computing device using a different mode. For instance, in this example, if the select user 10C wishes to transition from a live video stream in the communication session to another operating mode allowing that user to interact with other users in a 3D environment, the system transitions that user from one mode that allows them to interact with general content, documents, spreadsheets, and slide decks, to another mode that allows them to interact with 3D objects. This transition during a communication session allows the select user to use editing tools in each environment that is appropriate for different content types. For instance, if a person in a video stream wishes to leave a 2D mode that shows that user using a 2D image, and enter a 3D environment to show other users how to move an object in a specific location or to shape a particular 3D object, that user can do that more easily once they are able to make the transition within the communication session. That user, such as the third user 10C, Charlotte Smith, can make this transition using a desktop PC, without using any type of virtual reality or augmented reality headset, such as an HMD. As described herein, this transition using a desktop enables a user, such as the third user, to enter a 3D mode interacting with a 3D computing environment using a desktop computer, which may be more suitable for editing or viewing certain types of content.

The techniques disclosed herein also offer tools that are counter intuitive to other systems. For instance, even if a user is operating on a desktop computer, they can transition into a 3D environment without the use of a VR headset. this is counter intuitive to embodiments that require a user to put on the headset to enter a 3D environment. This enables the user to benefit from the accuracy of a PC, such as a mouse and a keyboard while also working in a 3D environment interacting with 3D objects. The user can benefit from gestures of a mouse to move objects, while using directional keys to navigate through the 3D environment.

Specific types of inputs, which can be computer generated or caused by a user input, can cause the transitions described herein. For instance, a user input such as a voice command, key input or other gesture can be used to invoke the transitions described herein. In addition, an input indicating that a remote user wants to share content with a select user can also invoke the transitions described herein. In a specific example, consider a scenario where the second user 10B shares a 3D file, such as an AutoCAD file, with the third user 10C. If this input is received while the second user is interacting with a computer via a 3D environment, and the third user is not interacting with a computer via the 3D environment, such an input received in that scenario can invoke the transitions described herein. In yet another embodiment, if this input is received from the second user while the second user is interacting with a computer via a 3D environment, and the third user is on a desktop computer and not interacting with the computer using a rendering of the 3D environment, such an input received in that scenario can invoke the transitions described herein. This can be counter intuitive relative to other systems in that the third user may be transitioned to a 3D environment even though that person is operating on a desktop computer and not using a head-mounted display (HMD) unit.

One of the technical advantages is that the system can allow a user to switch between a 3D mode and a 2D mode of a communication session Regardless of the hardware they are interacting with. That way, a person that is interacting with a specific type of content, such as a 3D model or AutoCAD file, using software that is best suited for a desktop computer using a mouse and a keyboard, that person can use a computer while also Interacting with content in a 3D environment. This is counter intuitive to existing systems in that those systems require a headset to interact with a 3D environment. When a user is utilizing a desktop computer or a device in communication with a keyboard and pointing device, such as a mouse, the system may allocate specific gestures that may be captured by a camera or special keys to allow the user to navigate throughout the 3D environment. This way, a traditional computer such as a desktop device, can allow the user to access the pointing device to make accurate movements to interact with an AutoCAD file, while also providing special keys or and then put device such as a camera to allow the user to navigate through a 3D environment.

The disclosed techniques provide a technical benefit where a user of a personal computer can change of their representation, e.g., how they appear to others, and also change how that user sees others from a given perspective, e.g., how others appear to the user, while maintaining operation of a single device, such as a desktop computer. In such scenarios, a user can maintain use of only one computing device, such as a desktop computer, while transferring from a 2D computing environment to a 3D computing environment. Thus, a user can start in a 2D computing environment and be represented by a rendering of a 2D image 151C, such as the representation shown in FIG. 1A. Then, in response to one or more inputs, such as a user starting to edit content having a particular file type, or based on an input indicating an instruction to perform a UI transition, the system can transition the UI to remove the rendering of the 2D image 151C, as shown in FIG. 1A, and generate a rendering of a 3D representation 251C of the user, such as the representation shown in FIG. 1B. This allows a user to make a transition to a 3D environment without actually utilizing an augmented reality or virtual reality (AR/VR) device.

The techniques also apply to other types of devices, such as a head-mounted display device. In such embodiments, a user can maintain use of only one computing device, such as a HMD, while transitioning an interaction model from a 3D computing environment to a 2D computing environment. Thus, a user can start in a 3D computing environment and be represented by a rendering of a 3D representation 251C, such as the representation shown in FIG. 1B. Then, in response to one or more inputs, such as a user starting to edit content having a particular file type or based on an input indicating an intent to perform a UI transition, the system can transition the UI to remove the rendering of the 3D representation 251C, as shown in FIG. 1B, and generate a rendering of a 2D image 151C of the user, such as the representation shown in FIG. 1A. This allows a user to make a transition to a 2D environment without actually utilizing a desktop device that utilizes a flat screen display and a keyboard.

FIGS. 2A and 2B illustrate another example of a transition of a user interface from having a display of a two-dimensional image of a user to a rendering of a three-dimensional representation of the user while the user is participating in a communication session. In this example, the user interface 201 is a rendering of a 3D environment based on a 3D model. In this example, the user interface 201 starts with a 3D rendering of a representation 251A of a first user 10A and a 3D rendering of a representation 251B of a second user 10B. The 3D renderings of each representation have a position and a direction that is determined by virtual object attributes stored in a 3D model. In this example, the 3D environment also includes a virtual object 275 that is in the form of a virtual flat screen TV mounted on the wall of the virtual environment. This virtual object 275 has a display surface that shows a virtual user interface that displays a 2D rendering 151C of the third user 10C and a 2D rendering 151D of the fourth user 10D. In this example, the system receives an input that identifies a user, which for illustrative purposes is the third user 10C associated with the rendering 151C of the 2D image.

As shown in FIGS. 2A and 2B, in response to the input for causing the transition of the display of a rendering of the 2D image of the user 10C to a rendering of a three-dimensional representation of the user 10C, the system modifies of the user interface arrangement 201 to remove the rendering 151D of the 2D image of the user 10C and add the display of the three-dimensional representation 251C of the user in a rendering of the 3D environment 200. This transition can cause the system to use a position and orientation data defined in a 3D model to place the user's avatar in the 3D environment.

Figure 3A:
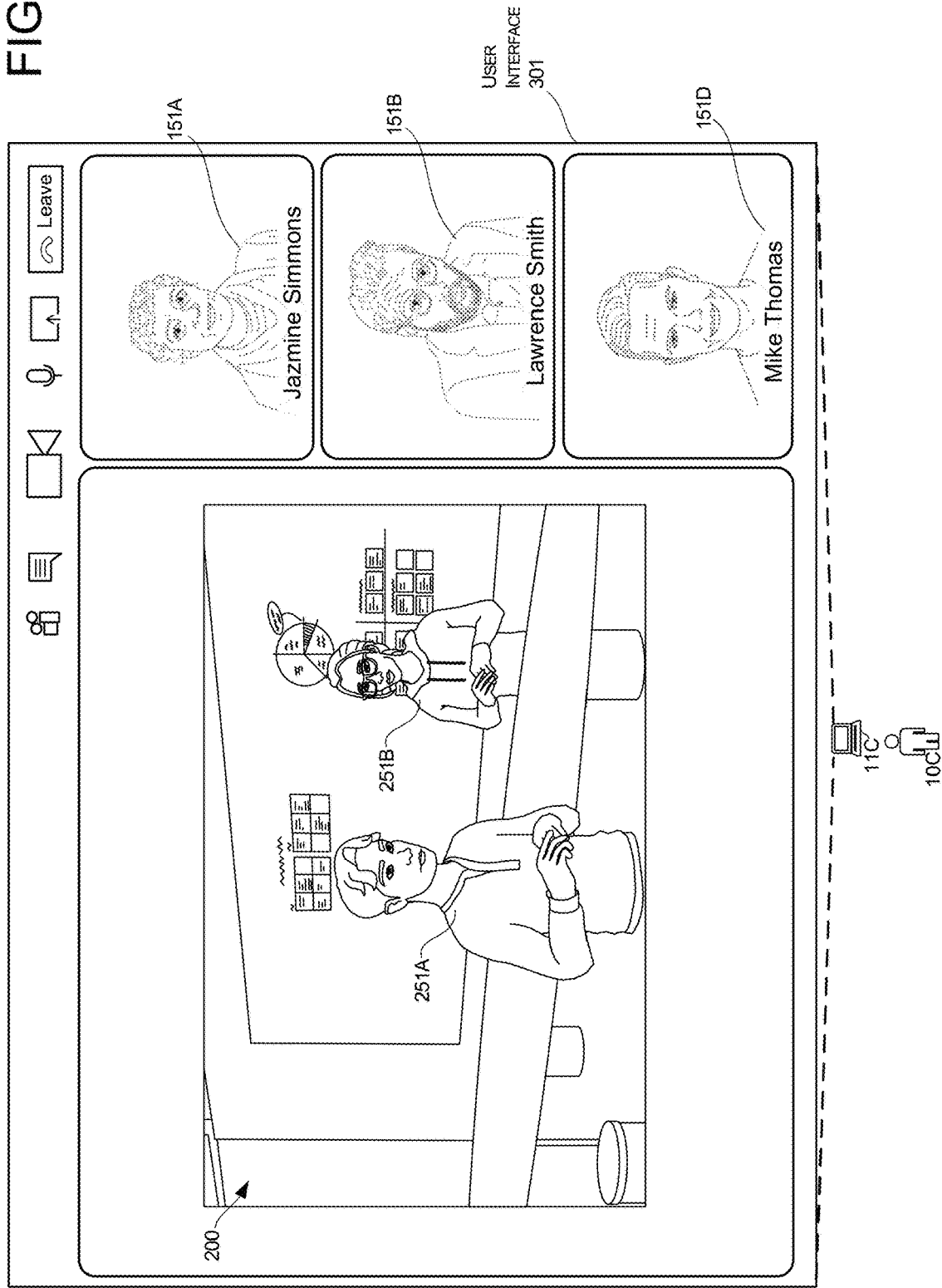
FIG. 3A illustrates the first user interface arrangement for a particular user identified in a user interface.
Figure 3B:
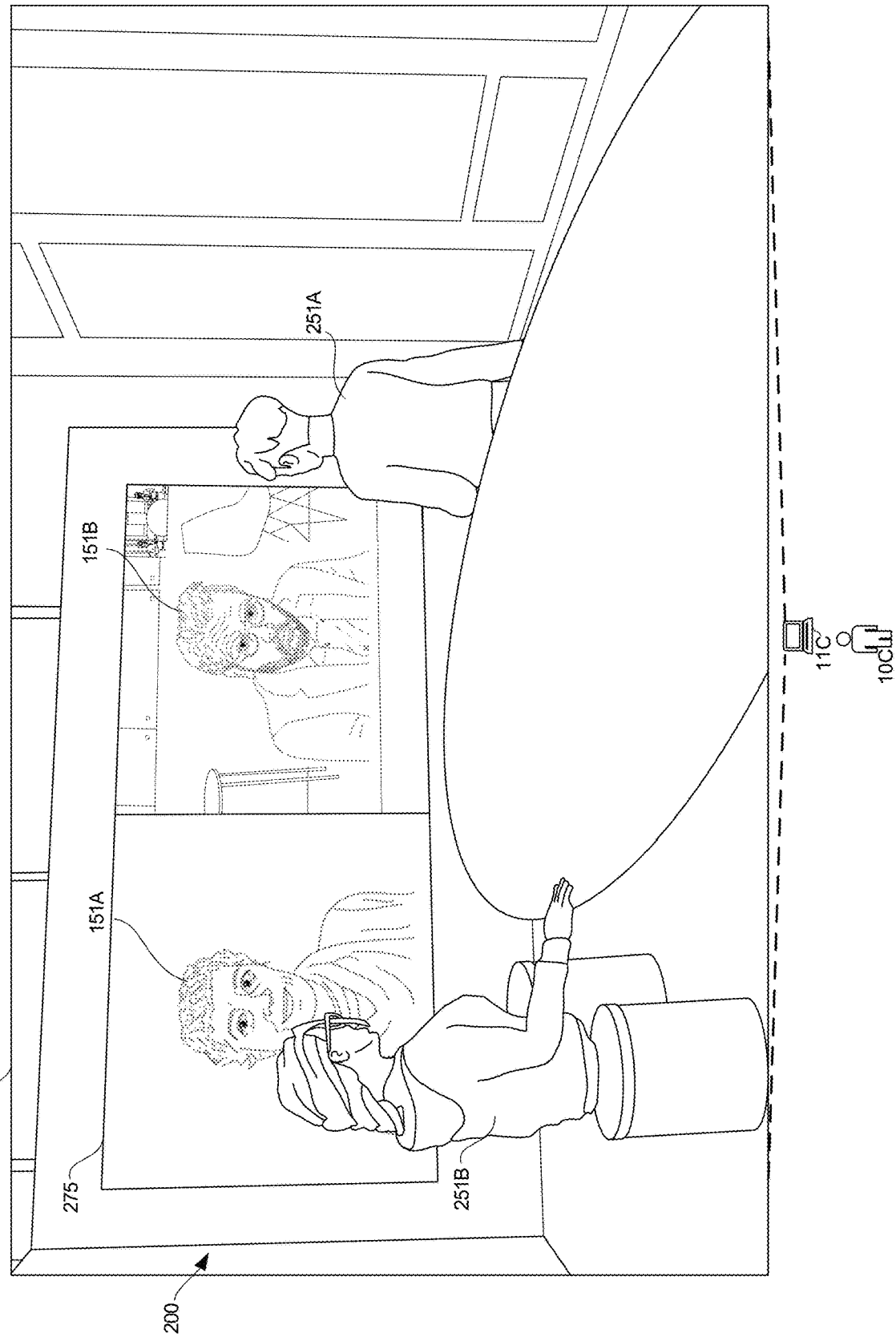
FIG. 3B illustrates the second user interface arrangement for a particular user identified in a user interface.

FIGS. 3A and 3B illustrate another aspect of the transition of the third user 10C, Charlotte Smith. These figures show a user interface 301 from the prospective of Charlotte's computer. These figures specifically show the user experience from Charlotte's perspective, e.g., how the transition appears to the third user that is being teleported from the 2D mode to the 3D mode. In this example, the rendering of the third user 10C undergoes a transition from the 2D mode, where they are displayed to others as a rendering of a 2D image, to a 3D mode, where they are represented to others as a 3D object in a 3D environment. To illustrate aspects of this transition from the third user's perspective, the user interface 301 shown in FIG. 3A is a user interface that is displayed on a computing device 11C of the third user 10C, Charlotte Smith. This shows the perspective to the third user what happens when the third user 10C makes a transition from 2D mode to 3D mode.

As shown in FIG. 3A, the user interface 301 starts with a display of 2D images of Jazmine, Lawrence and Mike, each respectively displayed as renderings of images 151A, 151B, and 151D. This user interface also includes a rendering of a 3D environment 200 that has two 3D representations 251A and 251B of other users. In response to the input data described herein, e.g., the third user editing a certain type of data or one or more users indicating in a voice or text chat that the third user is to transition to a 3D mode, the system performs the transition. In the transition of the third user, the third computer 11C of the third user 10C, transitions from the user interface shown in FIG. 3A to the user interface shown in FIG. 3B.

As shown in FIG. 3B, after the transition, Charlotte's computer, computer 11C, displays a modified user interface 301 having an enlarged rendering of the 3D environment 200 which includes two 3D representations 251A and 251B of two other users. The system maintains the state of each user, e.g., the two users displayed in FIG. 3A as 3D representations 251A and 251B, is also maintained as 3D representations 251A and 251B in FIG. 3B. Also shown in FIG. 3B, the modified user interface 301 also includes a virtual object 275, which in this example is a virtual display device, that shows the 2D renderings of the other users that were originally displayed in 2D images, e.g., Jazmine and Lawrence, in FIG. 3A. This modified user interface 301 now shows Charlotte's perspective as if she has teleported into a 3D environment from the 2D environment. Similar to the other examples, in this teleportation, the system can also determine a position and orientation for Charlotte's avatar based on one or more factors. In this example, the orientation and position of Charlotte's avatar has her facing shared content, e.g., the virtual display monitor and in a position at a virtual chair.

In such an example, Charlotte may be operating a single device, such as a PC, where she starts by viewing the meeting 2D mode, e.g., her perspective is not in the 3D environment. Then, in response to one or more inputs described herein, the system may transition from the user interface of FIG. 3A to the user interface of FIG. 3B all while she continues to use the desktop PC. The transition of this example can occur even without the use of a computer that is traditionally used to view 3D renderings, such as a HMD.

In another example, a transition can also involve a process where Charlotte starts with the user interface of FIG. 3B and transitions to the user interface of FIG. 3A. In such an example, Charlotte may be operating a single device, such as a head mounted display, where she starts by viewing the 3D environment shown in FIG. 3B. Then, in response to one or more inputs described herein, the system may transition from the user interface of FIG. 3B to the user interface of FIG. 3A, all while she continues to use the HMD. The transition of this example can occur even without the use of a computer that is traditionally used to view 2D images, such as a desktop.

As can be applied to the other examples described herein, in some embodiments, the transition that occurs on Charlotte's image is executed while maintaining the rendering types for other users. For instance, in the example of FIG. 3A, the user named Jazmine, is first displayed as a 2D rendering in FIG. 3A, and then after the transition for the third user, Charlotte, Jazmine is maintained as a 2D rendering in FIG. 3B. This also applies to the other users that are initially displayed as 3D renderings as shown in FIG. 3A. After Charlotte's transition, these users remain as 3D renderings as shown in FIG. 3B. This system controls the display of other users to minimize the distraction that may be caused by simultaneous transitions of multiple users.

Figure 4A:
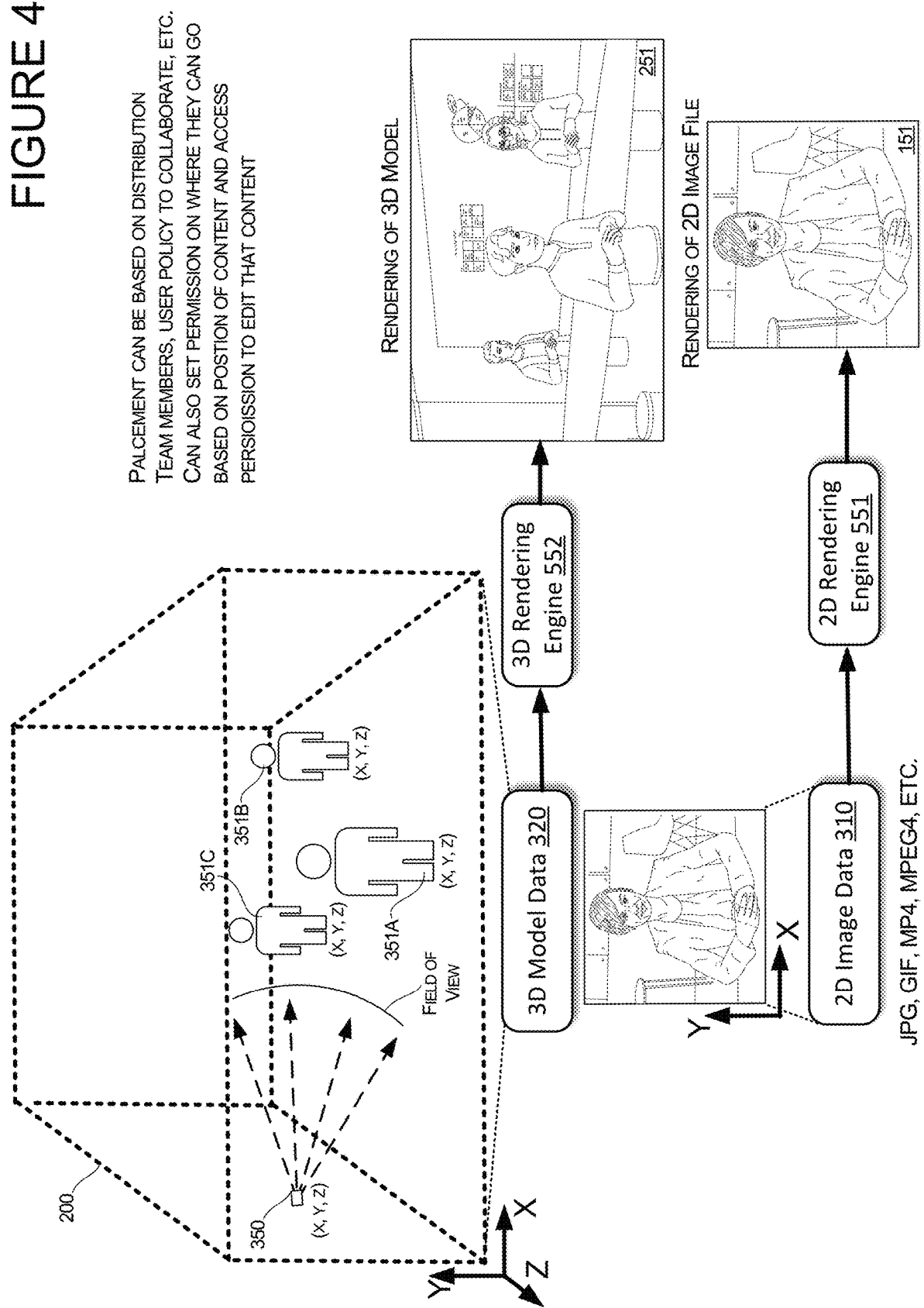
FIG. 4A illustrates additional features of the UI transition.

FIG. 4A illustrates additional features of the UI transition. In some embodiments, when an input is received for causing the UI transition from a rendering of the 2D image of the user 10C to a rendering of a 3D representation of the user 10C, the system can determine a location and orientation for the 3D representation of the user 10C. For instance, if a model of a virtual environment 200 starts with only two virtual objects 351A and 351B representing users, the system can determine a location and orientation of a newly added virtual object 351C representing a user. In this example, when an input indicates that a particular user, such as the third user 10C, the system can determine a location and orientation of the virtual object 351C representing the third user 10C based on the location of other users and/or the location of shared content within the virtual environment 200.

In one illustrative example, if the system determines that that a virtual object 351C used to represent the third user 10C is to be added to the virtual environment 200, the system can position the virtual object 351C in a way such that the virtual object 351C gives the appearance that the user's avatar is looking at content that is shared with the user 10C. In another example, if the system determines that that a virtual object 351C used to represent the third user 10C is to be added to the virtual environment 200, the system can position the virtual object 351C in a way such that the virtual object 351C gives the appearance that the user's avatar is looking at avatars of user's that are talking to the user 10C. As described herein, the system positions the person's avatar such that the avatar does not block other user's from viewing content and/or the system positions the person's avatar is directed toward salient information being shared within the virtual environment.

In some embodiments, placement of each virtual object 351 can be based on distribution of team members, user groups, and/or policies established by individual users or groups of users. For instance, if a person is part of a team within a corporation, when one of those individuals is identified in an input for transitioning the user interface, their corresponding avatar will be positioned within a threshold distance of other team members. The orientation of that user's avatar can be based on an analysis of the orientation of the avatars of their team members. For instance, if a threshold number of users within a team are looking at content, that user's avatar entering a 3D environment can be oriented to look at the content as well. The system can also configure permissions. For instance, when a particular user's avatar enters a 3D environment, and a threshold number of teammates are looking at content, the system may also provide access permissions for allowing that user to access that content. When the user leaves the 3D environment, that access can be revoked. A person's permissions may also mirror the permissions of other people in the 3D environment. For instance if other users of a team are able to edit content, a user on that team may also get editing rights for the time that they have an avatar in the 3D environment.

FIG. 4A also shows aspects of a system configured to implement the techniques disclosed herein. For illustrative purposes, a rendering of a 2D image file or a rendering of a 2D image of a user can be generated by a 2D rendering engine 551 receiving 2D image data 310, e.g., an image file. A rendering of a 2D image file can include a 2D environment, e.g., the background of an image, and a 2D object, e.g., an image of a person or an avatar. The image file, e.g., image data 310, can have pixels arranged in two dimensions, e.g., pixels arranged within a two-dimensional coordinate system (x, y). This data can also be referred to herein as a two-dimensional model that is based on a two-dimensional coordinate system. Each part of an image can be a pixel or any other geometric shape, such as a triangle. For instance, a group of pixels or triangles can be used to generate a rendering of a two-dimensional avatar of a user, or a live video image of a person.

A two-dimensional environment having a number of 2D images of participants of a communication session is also referred to herein as a "grid environment." Image data or a communication data stream can define a two-dimensional environment or a two-dimensional object, and that two-dimensional environment can be rendered on a display screen. The rendering can be referred to herein as a two-dimensional rendering of a two-dimensional environment or a two-dimensional rendering of a two-dimensional object. This is also referred to herein as a "rendering of the two-dimensional image."

For illustrative purposes, a rendering of a 3D model or a rendering of a 3D representation of the user can be generated by a 3D rendering engine 552 accessing 3D model data 320, e.g., a 3D model. A 3D model can include parameters defining a 3D environment 200, e.g., a model of a room, and parameters defining 3D objects, e.g., size, shape, and position data for representations 351 of users or other virtual objects. A three-dimensional environment is a computing environment model that is based on a three-dimensional coordinate system. Attributes of the three-dimensional environment and three-dimensional objects in the three-dimensional environment are based on components that are positioned within a three-dimensional coordinate system (x, y, z). Each component can be a triangle or any other geometric shape. Each of the components can have a position, e.g., a location in the three-dimensional coordinate system, as well as an orientation, e.g., a direction in which a triangle is pointed. For instance, a group of triangles can be used to generate a rendering of a three-dimensional avatar of a user or a three-dimensional rendering of a three-dimensional object.

A three-dimensional environment is also referred to herein as an "immersive environment." Model data or a three-dimensional model can be included in a communication data stream and the model data can define a three-dimensional environment. That three-dimensional environment can be based on a three-dimensional coordinate system. When the rendering engine 552 generates a 3D rendering from a 3D model, that rendering is generated from a reference point in the environment, e.g., a perspective having a position relative to the virtual environment. for illustrative purposes, a reference point is also referred to herein as a virtual camera 350. That camera can have a field of view which is used to generate a rendering of a 3D environment or a 3D object based on the position of the virtual camera 350. The rendering of a three-dimensional object in the three-dimensional environment is based on a position and orientation of the three-dimensional object and the position of the virtual camera 350.

In some embodiments, two-dimensional images can be displayed within a three-dimensional environment. This can occur, for instance, when a communication system receives a two-dimensional video stream of a user, but participants receiving that video stream are viewing a 3D environment with HMDs. This may cause the system to show the image of that user on as if they are appearing on a virtual television on the wall of the virtual environment. This is referred to herein as a two-dimensional rendering of a user within a three-dimensional environment. This can include the third user 10C shown in FIG. 2A as a rendering 151C.

In some embodiments, a three-dimensional environment and three-dimensional objects defined by a three-dimensional model can be displayed as a two-dimensional rendering. This can occur, for instance, when a communication session involves a user interface that shows two-dimensional images, e.g., when Teams is in Grid Mode. While in this mode, the system may need to display images of users interacting in a 3D environment. In this instance, a 2D image of the 3D environment is displayed from a particular position, e.g., a virtual camera position, and that 2D image is displayed within one of the grids. This rendering can be referred to herein as a two-dimensional rendering of a three-dimensional environment. To achieve a two-dimensional rendering of a three-dimensional environment, model data defining a three-dimensional environment can be projected using a transform. The transform can generate the rendering such that the width, height, and depth of a three-dimensional object can be expressed on a flat screen using vector projections from a model of the object to a point of view, e.g., a virtual camera position.

FIG. 4B illustrates two operating modes of a system and how each operating mode may change permissions for individuals participating in a communication session. In the first operating mode, top half of FIG. 4B, the permissions can allow a system to use an image file to display a 2D image of a user when a representation of that user is not included in a 3D model. In this case, the 3D model data is in a first state 320A where a select user does not have a virtual object representing that user within a 3D environment 200. When the 3D model is in this state, where the select user does not have a virtual object representing that user within a 3D environment, the permission data 315 associated with that user are configured to allow the system, and other users, to access image data 310 for that user. This means that the system, and the clients of each remote user, can generate a rendering of that user using the image data 310 or the system can edit the image data 310.

When the system detects that the 3D model data is in a second state, e.g., model data 320B includes a virtual object 351C representing the select user, the system modifies the permissions to restrict the use of the image data for that particular user. As shown, the permission data 315 is modified to restrict a system from reading the image data 310 to display a 2D image of that particular user. In this operating mode, the permissions are configured to restrict all users from accessing the image data, and thus all clients are prevented from accessing or displaying the 2D image file.

FIG. 5A and FIG. 5B illustrate features of a system configured for positioning a representation of a user within a 3D environment 200 relative to shared content. These figures illustrate a top view of a 3D environment 200. FIG. 5A illustrates the scenario where avatars for a first user 351A and a second user 351B are oriented to view shared content within the 3D environment. They shared content may be displayed on a virtual object, such as a virtual display screen. When the system detects that a threshold number of users are looking at the shared content, the system may generate an orientation for a third user having an avatar enter the 3D environment. one example of this feature is illustrated in FIG. 5B. In this example, an avatar of a third user 351C is added to the virtual environment. The avatar of the third user 351C is directed towards the shared content in response to the system detecting that the other users have the shared content within their field of view. The system can also determine the geometries of each person's field of view and determine a position for the third user's avatar such that the third user's avatar does not block the field of view for other users.

FIG. 6A and FIG. 6B illustrate features of a system configured for positioning a representation of a user within a 3D environment 200 relative to other users. FIG. 6A illustrates a scenario where avatars for a first user and a second user are oriented such that the users are looking at each other within the virtual environment. Within a particular team or a predetermined group, when the system determines that a threshold number of people are looking at each other. The system can Orient the avatar of a third user entering the environment such that the avatar is positioned to look at the other users. FIG. 6A shows a number of avatars that have at least three users having other group members within a field of view. When the system determines that a threshold number of avatars have other group members within a field of view, as shown in FIG. 6B, the system can allow a new group member to join the virtual environment having a position and orientation that allows that user to view other group members.

Figure 7:
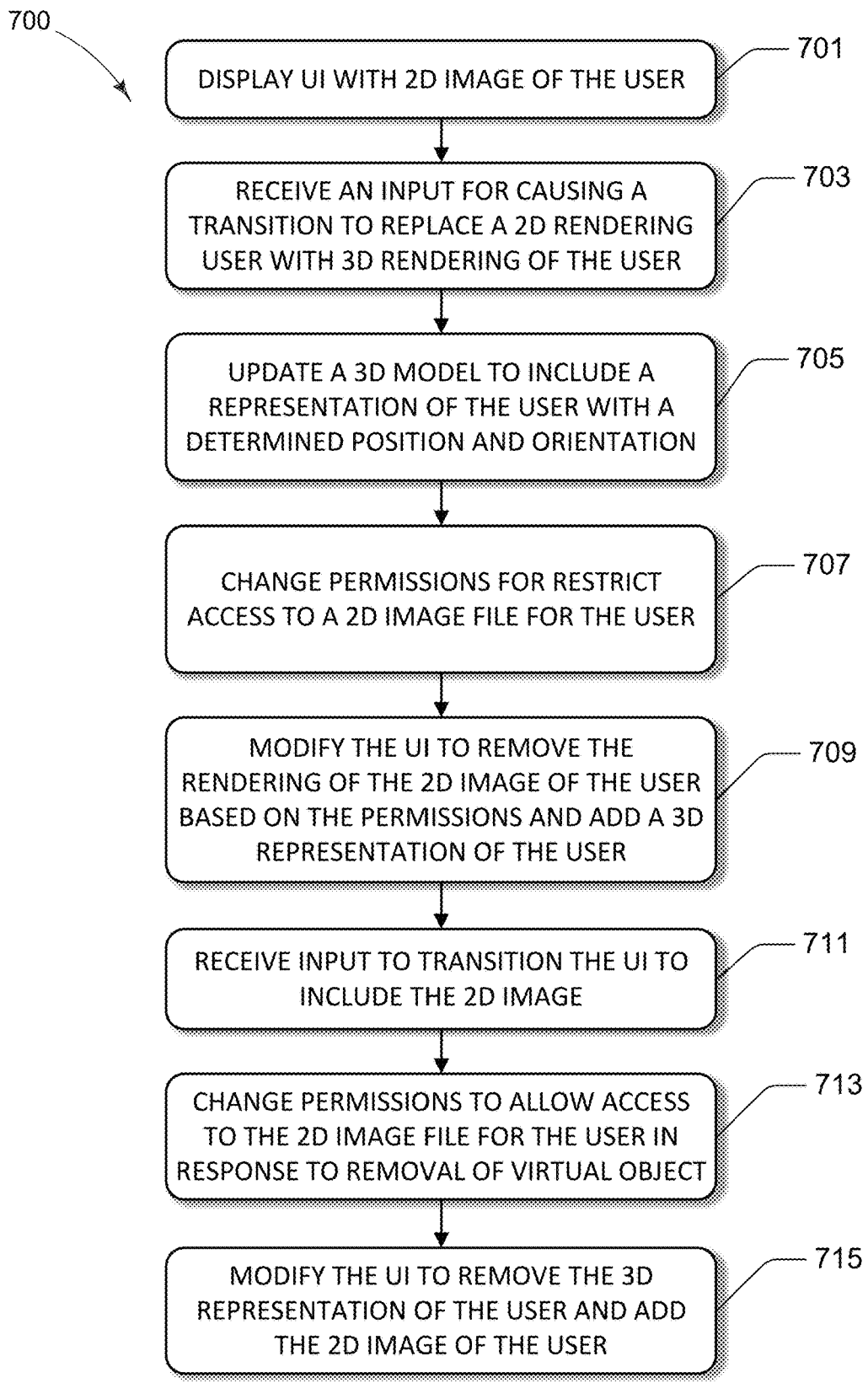
FIG. 7 is a flow diagram showing aspects of a routine that enables systems to transition a user interface arrangement from a display of a two-dimensional image of a user to a rendering of a three-dimensional representation of the user while the user is participating in a communication session.

FIG. 7 is a diagram illustrating aspects of a routine 700 for providing transitions of a user interface arrangement from a display of a two-dimensional image of a user to a rendering of a three-dimensional representation of the user while the user is participating in a communication session. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 7 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 700 includes an operation 701 where the system 100 displays a user interface that comprises a rendering of a 2D image of a particular user, also referred to herein as a "selected user." The user interface can include a number of other users that are displayed using 2D images, which can include live video or still images, or the other users can be represented by avatars such as a rendering of a 3D representation, such as an avatar.

At operation 703, the system can receive an input for causing a UI transition to remove the 2D rendering user and add a 3D rendering of the user. An example of this transition is shown in FIGS. 1A and 1B, where the third user 10C is first displayed using a 2D image or video. In response to the input, the 2D image is removed from the user interface and a 3 dimensional representation of the third user is displayed.

At operation 705, the system updates a 3D model to include a representation of the selected user with a determined position and orientation. In some configurations, the position and orientation may be set to a default or a landing area within the 3D model that is predetermined by one or more policies. in some configurations, the position and orientation of the representation of the selected user may be determined based on a position of other people that are associated with the selected user. For instance, if a selected user is associated with a number of people, e.g., teammates or coworkers, that person may be positioned with any predetermined distance of avatars of those teammates. The position and orientation of the representation of the selected user can also be based on a gaze direction of other representations in the three dimensional environment or the location of shared content with the selected user. For instance, if an avatar of the selected user is entering a 3D environment and other users are looking at shared content within the 3D environment, the representation of the selected user is positioned and oriented such that it is facing the shared content.

At operation 707, the system may change permissions in response to receiving the input to transition the user interface. In response to the input, the system may analyze the three dimensional model and determine if access permissions to a corresponding image of the selected user should be restricted or allowed. If the selected user has an associated representation within the 3D environment, the system will conform the permissions to restrict all users from accessing any 2D image file or 2D image steam of the selected user. However, if the selected user is not associated with representation within the 3D environment, the system will conform the permissions to allow all users to access 2D image file or 2D image steam of the selected user.

At operation 709, the system can modify the user interface to remove the rendering of the 2D image of the selected user based on the permissions. In addition, the system can access the 3D model to display a rendering of a 3D representation of the selected user on the user interface. The rendering of the 3D representation can be based on the position and orientation information in the 3D model.

At operation 711, the system can receive an input to transition the user interface to include the 2D image and remove the 3D representation of a selected user. In this particular example, the input is configured to cause the user interface transitions back from the user interface shown in FIG. 1B to the user interface shown in FIG. 1A.

At operation 713, the system changes permissions to allow access to the 2D image file or the 2D image stream and respond to the input to transition the user interface to include the 2D image and remove the 3D representation of a selected user.

At operation 715, the system can causes the transition of the user interface to include the 2D image and remove the 3D representation of a selected user. In in response to the input, the system causes the user interface to transition back from the user interface shown in FIG. 1B to the user interface shown in FIG. 1A.

Figure 8:
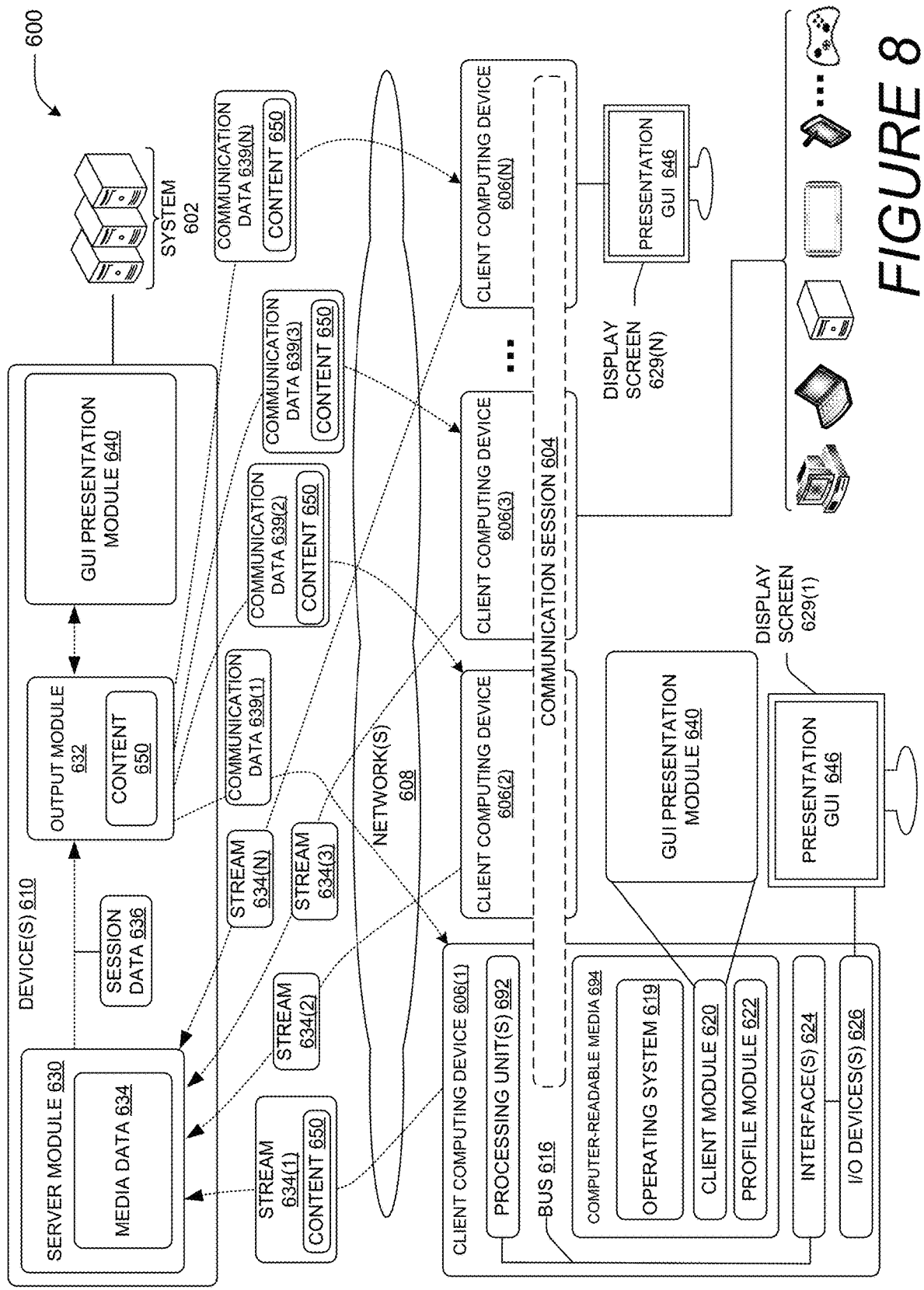
FIG. 8 is a computer architecture diagram illustrating an illustrative computer hardware and software architecture for a computing system capable of implementing aspects of the techniques and technologies presented herein.

FIG. 8 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 9:
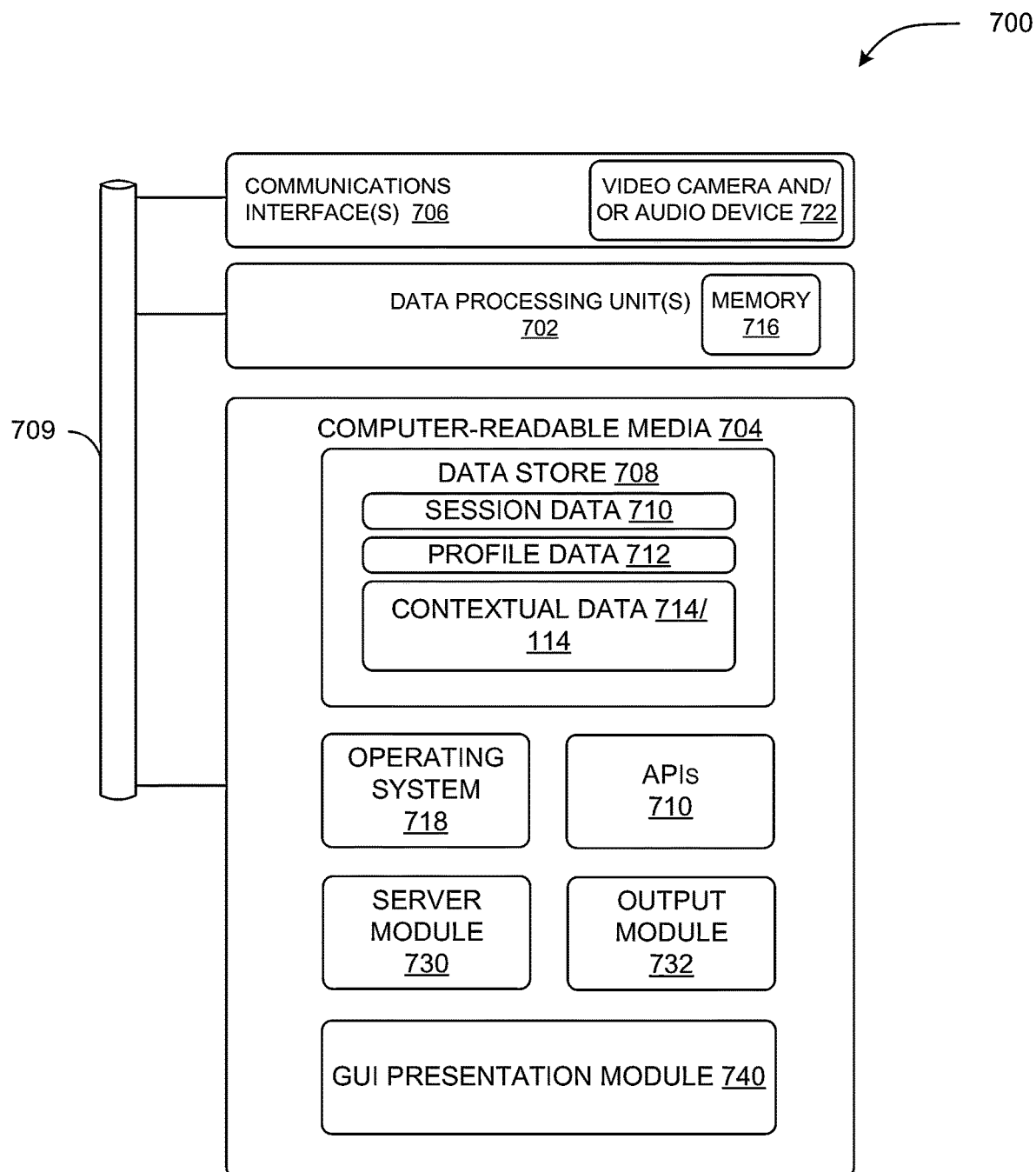
FIG. 9 is a computer architecture diagram illustrating a computing device architecture for a computing device capable of implementing aspects of the techniques and technologies presented herein.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 8), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

The following Example Clauses are to supplement the present disclosure.

Example Clause A. A method for transitioning a user interface (101) from a rendering of a two-dimensional image (151C) of a user (10C) to a rendering of a three-dimensional representation (251C) of the user (10C), a transition as shown in FIG. 1A to FIG. 1B, while the user (10C) is participating in a communication session (604), the method configured for execution on a system (100), the method comprising: causing a display of the user interface (101) comprising the rendering of the two-dimensional image (151C) of the user (10C), wherein the rendering of the two-dimensional image (151C) is from a two-dimensional image file (310), wherein the user interface (101) concurrently displays the rendering of the two-dimensional image (151C) of the user (10C) with renderings of other users (10A-10B) participating in the communication session (604) with the user (10C); this is included in FIG. 1A or 2A, the user starts in Gallery Mode, which is defined as "rendering of the two-dimensional image. Other users can be in either gallery or immersive mode. Gallery mode can be on a wall in a VR room or in standard grid mode; receiving an input for causing a transition of the display of the rendering of the two-dimensional image (151C) of the user (10C) to the rendering of the three-dimensional representation (251C) of the user (10C), wherein the input causes the system to access a three-dimensional model (320) defining a position and orientation of the three-dimensional representation (251C) of the user (10C) within a three-dimensional environment (200); This input is designed to cause the transition from the gallery mode to the immersive mode, the input causes the system to access a 3D model; and in response to the input for causing the transition of the display of the rendering of the two-dimensional image of the user to the rendering of the three-dimensional representation of the user, causing a modification of the user interface arrangement to remove the rendering of the two-dimensional image of the user (151) and add the display of the three-dimensional representation of the user (251C) in a rendering of the three-dimensional environment (200) using the position and the orientation defined in the three-dimensional model (320), this removes the 2D image and display the 3D model of the user in a 3D environment, e.g., a room. The 3D representation uses the 3D Model data to determine a position and direction of the user in the 3D environment.

Example Clause B. This embodiment is to transition from 3D to 2D using a single device, a transition as shown in FIG. 1B to FIG. 1A, a method for transitioning a user interface (101) from a rendering of a rendering of a three-dimensional representation (251C) of the user (10C) to a two-dimensional image (151C) of a user (10C) while the user (10C) is participating in a communication session (604), the method configured for execution on a system (100), the method comprising: causing a display of the user interface (101) comprising the rendering of the three-dimensional representation (251C) of the user (10C), wherein the user interface (101) concurrently displays the three-dimensional representation (251C) of the user (10C) with renderings of other users (10A-10B) participating in the communication session (604) with the user (10C), the renderings of other users can be in either 2D images or 3D representations; this feature is included in FIG. 1A or 2A, the user starts in Immersive Mode, which is defined as rendering of the 3D renderings, the other users can be in either gallery or immersive mode; receiving an input for causing a transition of the display of the rendering of the three-dimensional representation (251C) of the user (10C) to the two-dimensional image (151C) of the user (10C), this input is designed to cause the transition from the immersive mode to the gallery mode, the input causes the system to move from accessing a 3D model to accessing a 2D image file; and in response to the input for causing the transition of the display of the rendering of three-dimensional representation (251C) of the user (10C) to the two-dimensional image (151C) of the user (10C), causing a modification of the user interface arrangement to remove the rendering of the three-dimensional representation (251C) of the user (10C) and add the display of the two-dimensional image (151C) of the user (10C).

Example Clause C. A method for transitioning a user interface (101), as shown in the transition from FIG. 3A to FIG. 3B, in coordination with a change of a system operating mode from a first operating mode where a user (10C) is displayed to other users (10A-10B, 10D-10E) of a communication session as a rendering of a 2D image (151C) to a second operating mode where the user is displayed to other users of the communication session as a rendering of a 3D representation (251C) of the user (10C) while the user (10C) is participating in the communication session (604), the method configured for execution on a system (100), the method comprising:

causing, in response to being in the first operating mode, a display of the user interface (101) on a display device of a computer (11C) associated with the user (10C), the user interface (101) comprising renderings of 2D images (151A-151B) of a first set of users (10A-10B) of the other users participating in the communication session (604) with the user (10C), the user interface (101) further comprising renderings of 3D representations (251A-251B) of a second set of users (10D-10E) of the other users participating in the communication session (604) with the user (10C), wherein a first viewing perspective of the renderings of 3D representations (251A-251B) is based on a position of virtual objects (351A-351B) of the 3D representations (251A-251B) within a 3D environment (200) relative to a position of a virtual camera (350); in FIG. 3A, the third user Starts in Gallery Mode, where the 3D environment is a smaller window showing the front of the avatars, receiving an input for causing the change of the system operating mode from the first operating mode where the user (10C) is displayed to the other users (10A-10B, 10D-10E) of the communication session as the rendering of the 2D image (151C) to the second operating mode where the user is displayed to the other users of the communication session as the rendering of the 3D representation (251C) of the user (10C) while the user (10C) is participating in a communication session (604); as shown in FIG. 1A and FIG. 1B, and in response to the input for causing the change of the system operating mode from the first operating mode to the second operating mode, cause a modification of the user interface (101) to enlarge the rendering of the 3D environment (200) relative to a first size of the rendering of the 3D environment (200) while in the first operating mode, wherein a viewing perspective of the 3D environment (200) for the user (10C) is based on a location and an orientation of a virtual object (351C) associated with the 3D representation (251C) of the user (10C), wherein a second viewing perspective of the 3D representations (251A-251B) is based on the location and the orientation of the virtual object (351C) associated with the 3D representation (251C) of the user (10C) relative to the position of the virtual objects (351A-351B) of the 3D representations (251A-251B) within a 3D environment (200), which show the back of the avatars in this example, wherein the second operating mode causes the user interface to include the 2D images (151A-151B) of a first set of users (10A-10B) in a virtual object (275) formed as a virtual display screen positioned with the virtual environment (200).

Example Clause D. A method for transitioning a user interface (101), as shown in the transition from FIG. 3B to FIG. 3A, in coordination with a change of a system operating mode from a second operating mode where the user is displayed to other users of the communication session as a rendering of a 3D representation (251C) of a user (10C), FIG. 1B, while the user (10C) is participating in the communication session (604) to a first operating mode where the user (10C) is displayed to other users (10A-10B, 10D-10E) of a communication session as a rendering of a 2D image (151C), FIG. 1A, the method configured for execution on a system (100), the method comprising: causing, in response to being in the second operating mode, as shown in FIG. 3B, a display of the user interface (101) on a display device of a computer (11C) associated with the user (10C), the user interface (101) comprising a first size of a rendering of a 3D environment (200), wherein a first viewing perspective of the 3D environment (200) for the user (10C) is based on a location and an orientation of a virtual object (351C) associated with the 3D representation (251C) of the user (10C), e.g., where the other avatars are positioned relative to the user's avatar, wherein the second operating mode causes the user interface to include the 2D images (151A-151B) of a first set of users (10A-10B) in a virtual object (275) formed as a virtual display screen positioned with the virtual environment (200). receiving an input for causing the change of the system operating mode from the second operating mode where the user is displayed to the other users of the communication session as the rendering of the 3D representation (251C) of the user (10C), FIG. 1B, while the user (10C) is participating in a communication session (604) to the first operating mode where the user (10C) is displayed to the other users (10A-10B, 10D-10E) of the communication session as the rendering of the 2D image (151C) as shown in FIG. 1A; and in response to the input for causing the change of the system operating mode from the second operating mode to the first operating mode, cause a modification of the user interface (101) to reduce the rendering of a 3D environment (200) from the first size, while in the first operating mode, the user interface (101) comprising renderings of 3D representations (251A-251B) of a second set of users (10D-10E) of the other users participating in the communication session (604) with the user (10C), wherein a second viewing perspective of the renderings of 3D representations (251A-251B) is based on a position of virtual objects (351A-351B) of the 3D representations (251A-251B) within a 3D environment (200) relative to a position of a virtual camera (350), wherein the first operating mode causes the 2D images (151A-151B) of the first set of users (10A-10B) to be displayed without the display of the virtual object (275).

Example Clause E. The method of any of the Example Clauses, wherein the input for causing the transition includes input data indicating that the user is interacting with a computing device having a keyboard and mouse, wherein permission data is modified to allow the transition based on a detection of the keyboard and mouse in communication of a client computing device associated with the user (10C), wherein the system is configured to only allow the transition of the user interface in response to determining that the permission data allows the transition based on the detection of the keyboard and mouse in communication with the client computing device.

Example Clause F. The method of any of the Example Clauses, wherein the input for causing the transition includes input data indicating that the user is interacting with a desktop computing device having a keyboard, wherein permission data is modified to allow the transition based on a detection of the keyboard in communication of the desktop computing device associated with the user (10C), wherein the system is configured to only allow the transition of the user interface in response to determining that the permission data allows the transition based on the detection of the keyboard in communication with the desktop computing device associated with the user, wherein the transition of the user interface is only allowed in response to a detection that the user has maintained use of the desktop computing device having the keyboard.

Example Clause G. The method of any of the Example Clauses, wherein the input for causing the transition includes input data indicating that the user is interacting with a computer that is in the form of a head-mounted display device for displaying augmented reality or virtual reality computing environments, wherein the system is configured to only allow the transition of the user interface in response to determining that the permission data allows the transition based on the detection that the user has maintained use of the computer that is in the form of a head-mounted display device.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for transitioning a user interface from a rendering of a two-dimensional image of a user to a rendering of a three-dimensional representation of the user while the user is participating in a communication session, the method configured for execution on a system, the method comprising:
   receiving a live video stream from an image video camera directed toward the user for the generation of rendering of the two-dimensional image of the user within a two-dimensional 2D environment;
   providing the two-dimensional environment for the communication session and a three-dimensional environment for the communication session, the three-dimensional environment including virtual objects that are positioned based on coordinates;
   causing a display of the user interface comprising the rendering of the two-dimensional image of the user, wherein the rendering of the two-dimensional image is generated from the live video stream of the camera directed toward the user, wherein the user interface concurrently displays the rendering of the two-dimensional image of the user with renderings of other users participating in the communication session with the user;
   during the communication session, receiving an input for causing a transition of the display of the rendering of the two-dimensional image of the user to the rendering of the three-dimensional representation of the user; and
   in response to the input for causing the transition of the display of the rendering of the two-dimensional image of the user to the rendering of the three-dimensional representation of the user:
   accessing a three-dimensional model defining a position and orientation of the three-dimensional representation of the user within the three-dimensional environment, and
   removing the rendering of the two-dimensional image of the user from the two-dimensional environment, and
   adding the display of the three-dimensional representation of the user in a rendering of the three-dimensional environment using the position and the orientation defined in the three-dimensional model.

2. The method of claim 1, wherein the input for causing the transition includes input data indicating that the user is interacting with a computing device having a keyboard and mouse, wherein permission data is modified to allow the transition based on a detection of the keyboard and mouse in communication of a client computing device associated with the user, wherein the system is configured to only allow the transition of the user interface in response to determining that the permission data allows the transition based on the detection of the keyboard and mouse in communication with the client computing device.

3. The method of claim 1, wherein the input for causing the transition includes input data indicating that the user is interacting with a desktop computing device having a keyboard, wherein permission data is modified to allow the transition based on a detection of the keyboard in communication of the desktop computing device associated with the user, wherein the system is configured to only allow the transition of the user interface in response to determining that the permission data allows the transition based on the detection of the keyboard in communication with the desktop computing device associated with the user.

4. The method of claim 1, wherein the position and orientation of the three-dimensional representation is configured to provide a display of the representation such that the representation is appearing to look at a rendering of shared content in response to determining that a threshold number of representations of other users participating in the communication session are positioned to appear to be looking at the rendering of the shared content.

5. The method of claim 1, wherein the input for causing the transition includes input data indicating that the user has put on a head-mounted display device for use in the communication session, wherein the input data is generated from a motion sensor mounted to the head-mounted display device, the sensor detecting movement of the user indicating that the user has put on a head-mounted display device.

6. A system for transitioning a user interface from a rendering of a two-dimensional image of a user to a rendering of a three-dimensional representation of the user while the user is participating in a communication session, the system comprising:
   one or more processing units; and
   a computer-readable storage medium having encoded thereon computer-executable instructions to cause the one or more processing units to perform a method comprising:
   receiving a live video stream from an image video camera directed toward the user for the generation of rendering of the two-dimensional image of the user within a two-dimensional 2D environment;
   providing the two-dimensional environment for the communication session and a three-dimensional environment for the communication session, the three-dimensional environment including virtual objects that are positioned based on coordinates;
   causing a display of the user interface comprising the rendering of the two-dimensional image of the user, wherein the rendering of the two-dimensional image is generated from the live video stream of the camera directed toward the user, wherein the user interface concurrently displays the rendering of the two-dimensional image of the user with renderings of other users participating in the communication session with the user;

during the communication session, receiving an input for causing a transition of the display of the rendering of the two-dimensional image of the user to the rendering of the three-dimensional representation of the user; and in response to the input for causing the transition of the display of the rendering of the two-dimensional image of the user to the rendering of the three-dimensional representation of the user:

accessing a three-dimensional model defining a position and orientation of the three-dimensional representation of the user within the three-dimensional environment, and removing the rendering of the two-dimensional image of the user from the two-dimensional environment, and adding the display of the three-dimensional representation of the user in a rendering of the three-dimensional environment using the position and the orientation defined in the three-dimensional model.

7. The system of claim 6, wherein the input for causing the transition includes input data indicating that the user is interacting with a computing device having a keyboard, wherein permission data is modified to allow the transition based on a detection of the keyboard in communication of a client computing device associated with the user, wherein the system is configured to only allow the transition of the user interface in response to determining that the permission data allows the transition based on the detection of the keyboard in communication with the client computing device associated with the user.

8. The system of claim 6, wherein the position and orientation of the three-dimensional representation is configured to provide a display of the representation such that the representation is appearing to look at a rendering of shared content in response to determining that a threshold number of representations of other users participating in the communication session are positioned to appear to be looking at the rendering of the shared content.

9. The system of claim 6, wherein the position and orientation of the three-dimensional representation is configured to provide a display of the representation such that the representation is appearing to look at the representations of other users participating in the communication session, in response to determining that a threshold number of representations of other users participating in the communication session are positioned and oriented to appear to be looking at one another.

10. The system of claim 6, wherein the input for causing the transition includes input data indicating that the user has put on a head-mounted display device for use in the communication session, wherein the input data is generated from a motion sensor mounted to the head-mounted display device, the sensor detecting movement of the user indicating that the user has put on a head-mounted display device.

11. The system of claim 6, wherein the input for causing the transition includes input data indicating a predetermined device type, wherein permission data is modified to allow the transition based on a detection of the predetermined device type being a desktop computing device, wherein the system is configured to only allow the transition of the user interface in response to determining that the permission data allows the transition based on the detection of the detection of the predetermined device type.

12. A computer-readable storage medium having encoded thereon computer-executable instructions to cause one or more processing units of a system to perform a method for transitioning a user interface from a rendering of a two-dimensional image of a user to a rendering of a three-dimensional representation of the user while the user is participating in a communication session, the method comprising:

receiving a live video stream from an image video camera directed toward the user for the generation of rendering of the two-dimensional image of the user within a two-dimensional 2D environment;

providing the two-dimensional environment for the communication session and a three-dimensional environment for the communication session, the three-dimensional environment including virtual objects that are positioned based on coordinates;

causing a display of the user interface comprising the rendering of the two-dimensional image of the user, wherein the rendering of the two-dimensional image is generated from the live video stream of the camera directed toward the user, wherein the user interface concurrently displays the rendering of the two-dimensional image of the user with renderings of other users participating in the communication session with the user;

during the communication session, receiving an input for causing a transition of the display of the rendering of the two-dimensional image of the user to the rendering of the three-dimensional representation of the user; and in response to the input for causing the transition of the display of the rendering of the two-dimensional image of the user to the rendering of the three-dimensional representation of the user:

accessing a three-dimensional model defining a position and orientation of the three-dimensional representation of the user within the three-dimensional environment, and removing the rendering of the two-dimensional image of the user from the two-dimensional environment, and adding the display of the three-dimensional representation of the user in a rendering of the three-dimensional environment using the position and the orientation defined in the three-dimensional model.

13. The computer-readable storage medium of claim 12, wherein the input for causing the transition includes input data indicating that the user is interacting with a computing device having a keyboard and mouse, wherein permission data is modified to allow the transition based on a detection of the keyboard and mouse in communication of a client computing device associated with the user, wherein the system is configured to only allow the transition of the user interface in response to determining that the permission data allows the transition based on the detection of the keyboard and mouse in communication with the client computing device.

14. The computer-readable storage medium of claim 12, wherein the input for causing the transition includes input data indicating that the user is interacting with a computing device having a keyboard, wherein permission data is modified to allow the transition based on a detection of the keyboard in communication of a client computing device associated with the user, wherein the system is configured to only allow the transition of the user interface in response to determining that the permission data allows the transition based on the detection of the keyboard in communication with the client computing device associated with the user.

15. The computer-readable storage medium of claim 12, wherein the position and orientation of the three-dimensional representation is configured to provide a display of the representation such that the representation is appearing to look at a rendering of shared content in response to determining that a threshold number of representations of other users participating in the communication session are positioned to appear to be looking at the rendering of the shared content.

16. The computer-readable storage medium of claim 12, wherein the position and orientation of the three-dimensional representation is configured to provide a display of the representation such that the representation is appearing to look at the representations of other users participating in the communication session, in response to determining that a threshold number of representations of other users participating in the communication session are positioned and oriented to appear to be looking at one another.

17. The computer-readable storage medium of claim 12, wherein the input for causing the transition includes input data indicating that the user has put on a head-mounted display device for use in the communication session, wherein the input data is generated from a motion sensor mounted to the head-mounted display device, the sensor detecting movement of the user indicating that the user has put on a head-mounted display device.

18. The method of claim 1, wherein the renderings of other users participating in the communication session are maintained in the user interface during the modification that removes the rendering of the two-dimensional image of the user and adds the three-dimensional representation of the user.

19. The method of claim 1, wherein the user interface comprises a 2D region and a 3D region, wherein the modification of the user interface arrangement removes the rendering of the two-dimensional image of the user from the 2D region and adds the three-dimensional representation of the user within the 3D region.

20. The method of claim 1, wherein the user interface concurrently displays the two-dimensional environment and the three-dimensional environment.

* * * * *